United States Patent
Nishida

(10) Patent No.: US 10,949,011 B1
(45) Date of Patent: Mar. 16, 2021

(54) TOUCH PANEL SYSTEM

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 16/967,397

(22) PCT Filed: Mar. 26, 2019

(86) PCT No.: PCT/JP2019/012652
§ 371 (c)(1),
(2) Date: Aug. 4, 2020

(87) PCT Pub. No.: WO2019/189052
PCT Pub. Date: Oct. 3, 2019

(30) Foreign Application Priority Data

Mar. 27, 2018 (JP) .............................. JP2018-059290

(51) Int. Cl.
*G06F 3/041* (2006.01)
*G06T 7/90* (2017.01)
(Continued)

(52) U.S. Cl.
CPC ............ *G06F 3/0412* (2013.01); *G06F 3/044* (2013.01); *G06T 7/90* (2017.01); *H04N 5/36965* (2018.08);
(Continued)

(58) Field of Classification Search
None
See application file for complete search history.

(56) References Cited

U.S. PATENT DOCUMENTS

| 2009/0189871 | A1* | 7/2009 | Yoon | ........................ G06F 3/016 345/173 |
| 2011/0007023 | A1* | 1/2011 | Abrahamsson | ....... G06F 3/0416 345/174 |

(Continued)

FOREIGN PATENT DOCUMENTS

| JP | 2001337623 A | 12/2001 |
| JP | 2001350586 A | 12/2001 |

(Continued)

OTHER PUBLICATIONS

International Search Report (ISR) dated Jun. 11, 2019, issued for International application No. PCT/JP2019/012652. (1 page).

*Primary Examiner* — Duane N Taylor, Jr.
(74) *Attorney, Agent, or Firm* — Law Office of Katsuhiro Arai

(57) ABSTRACT

A touch panel system 1 includes: a bag-shaped touch panel body part V having a flexible touch face 11 and a visible light transmittable opposite face 12, wherein a colored fluid 20 is contained in a space between the touch face and the opposite face; a camera 50 for taking an image of the opposite face; and an image analysis part 100 for analyzing RGB values of pixels in the image captured by the camera, wherein the camera captures a change in color of the opposite face resulting from an external force applied to the touch face and making the opposite face closer in distance, moving the fluid from the location 14; and the image analysis part calculates at least coordinates of the location or shape of the location based on the RGB value analysis results, and reflects the result in an image on an image display device.

20 Claims, 25 Drawing Sheets

(51) Int. Cl.
*G06F 3/044* (2006.01)
*H04N 5/369* (2011.01)
*G02B 27/01* (2006.01)

(52) U.S. Cl.
CPC .... *G02B 27/017* (2013.01); *G02B 2027/0138* (2013.01)

(56) References Cited

U.S. PATENT DOCUMENTS

2019/0004644 A1\* 1/2019 Yao .................. G02B 26/005
2019/0235654 A1 8/2019 Nishida

FOREIGN PATENT DOCUMENTS

| JP | 2010277461 A | 12/2010 |
| JP | 5306059 B2 | 10/2013 |
| JP | 2014134454 A | 7/2014 |
| JP | 6086461 B1 | 3/2017 |
| WO | 2018047803 A1 | 3/2018 |

\* cited by examiner

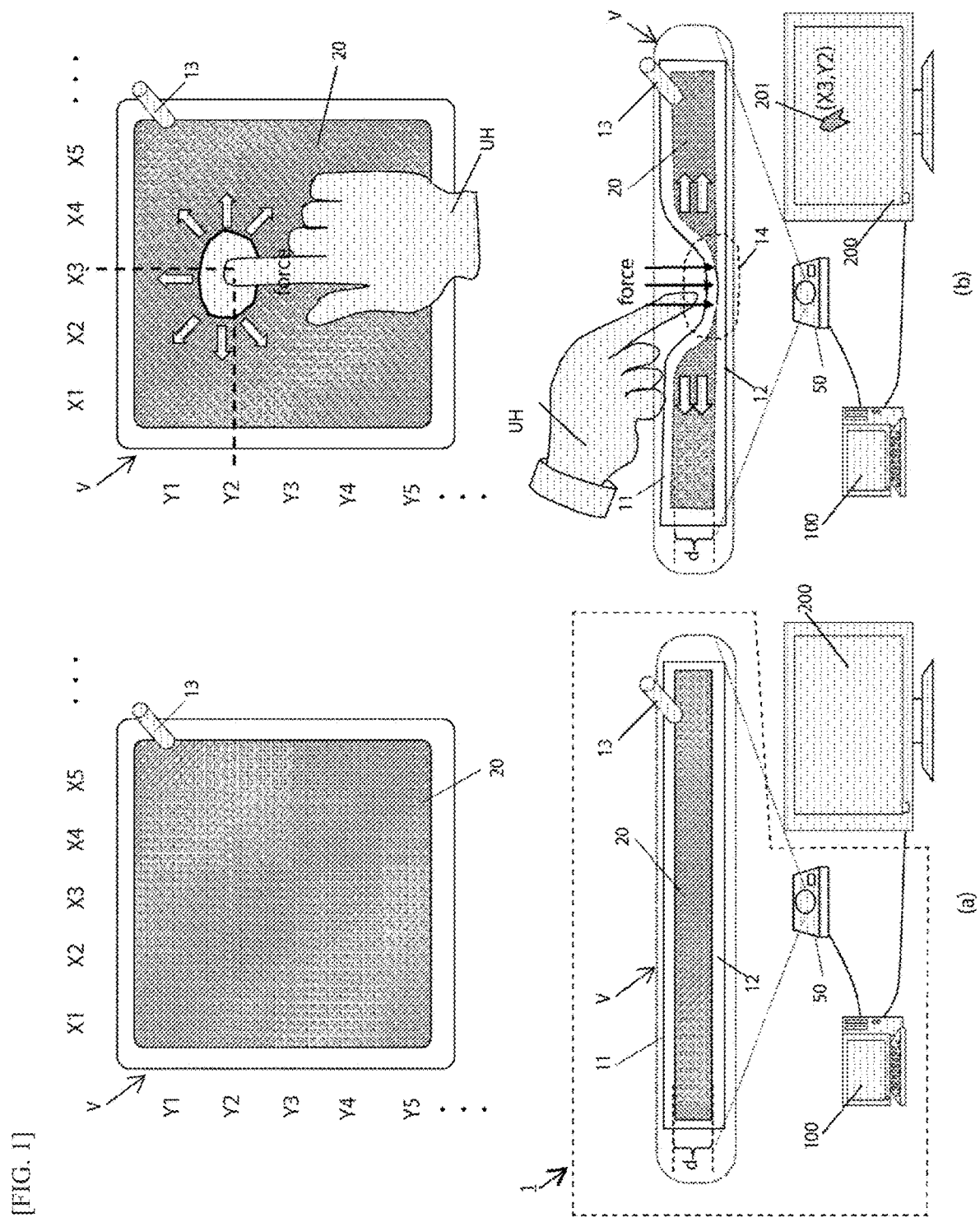

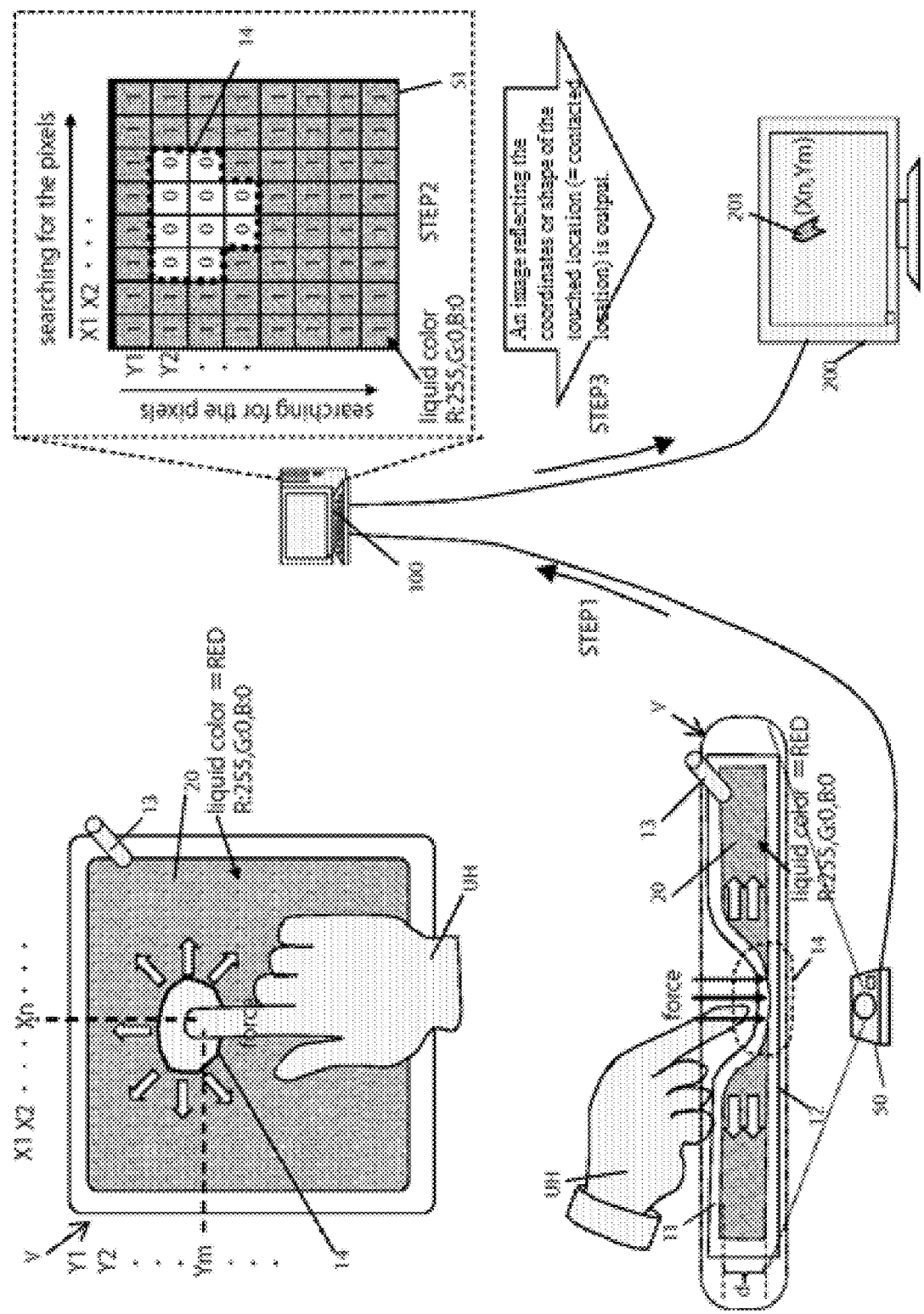
[FIG. 2]

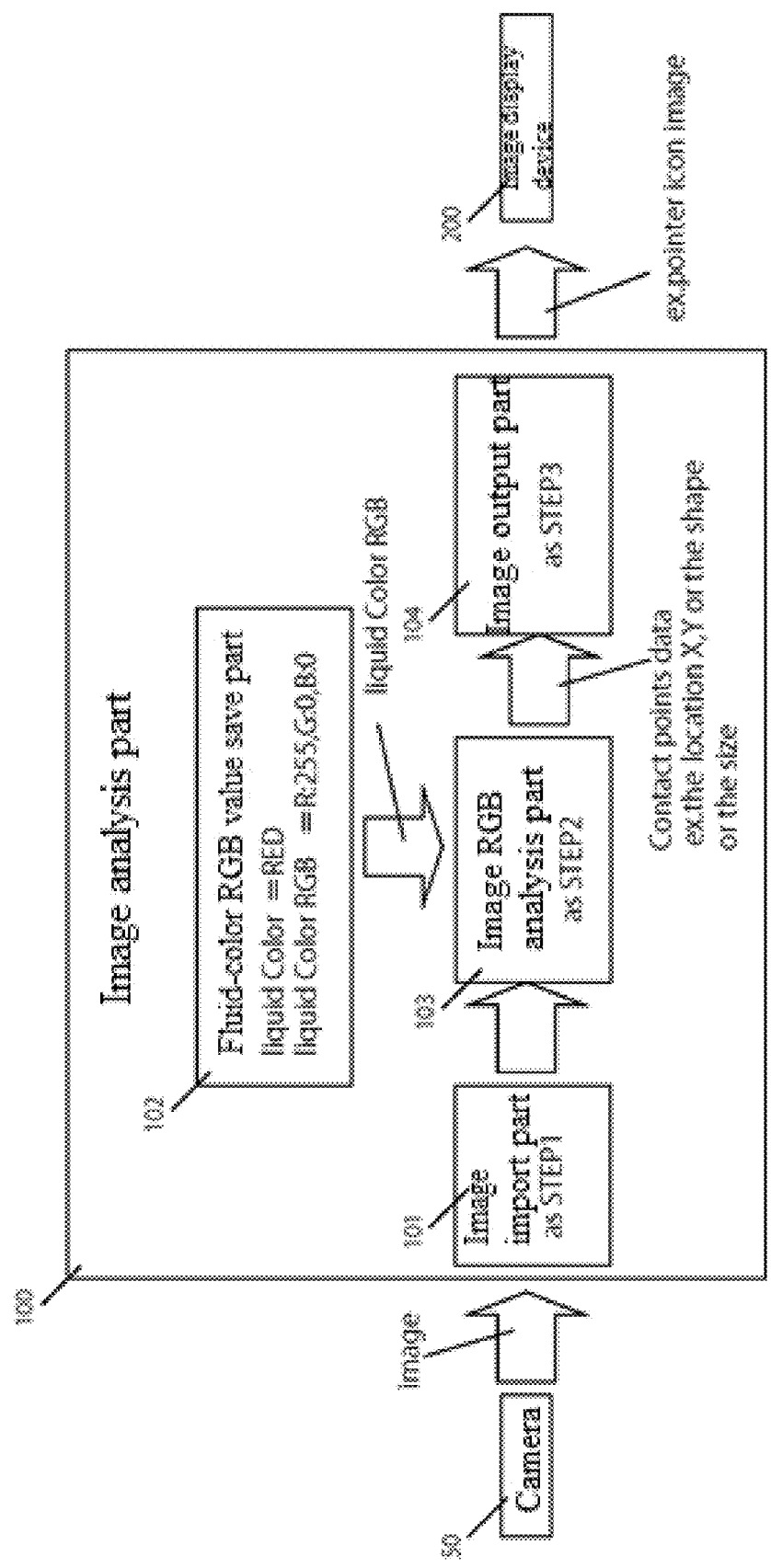
[FIG. 3]

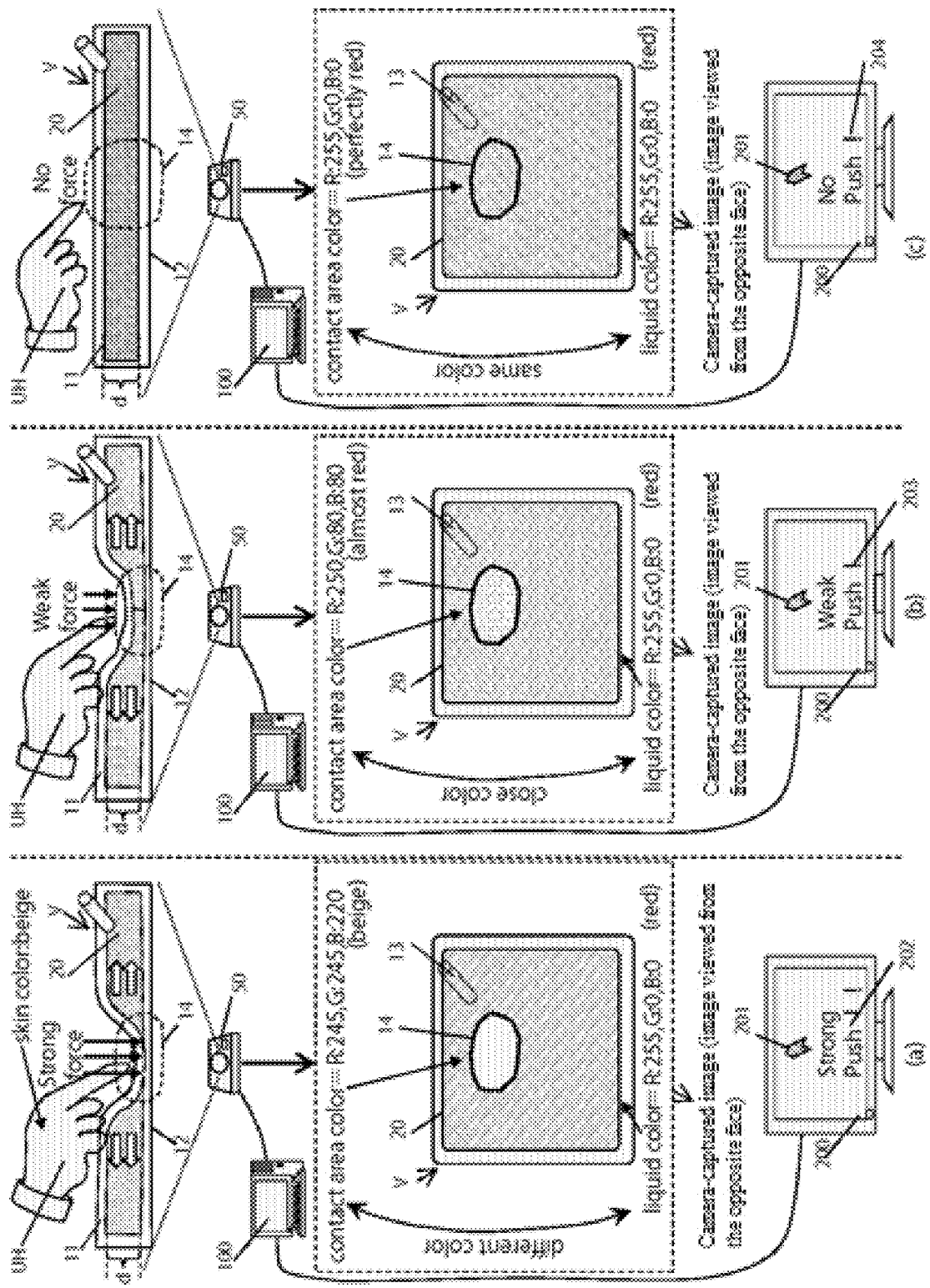

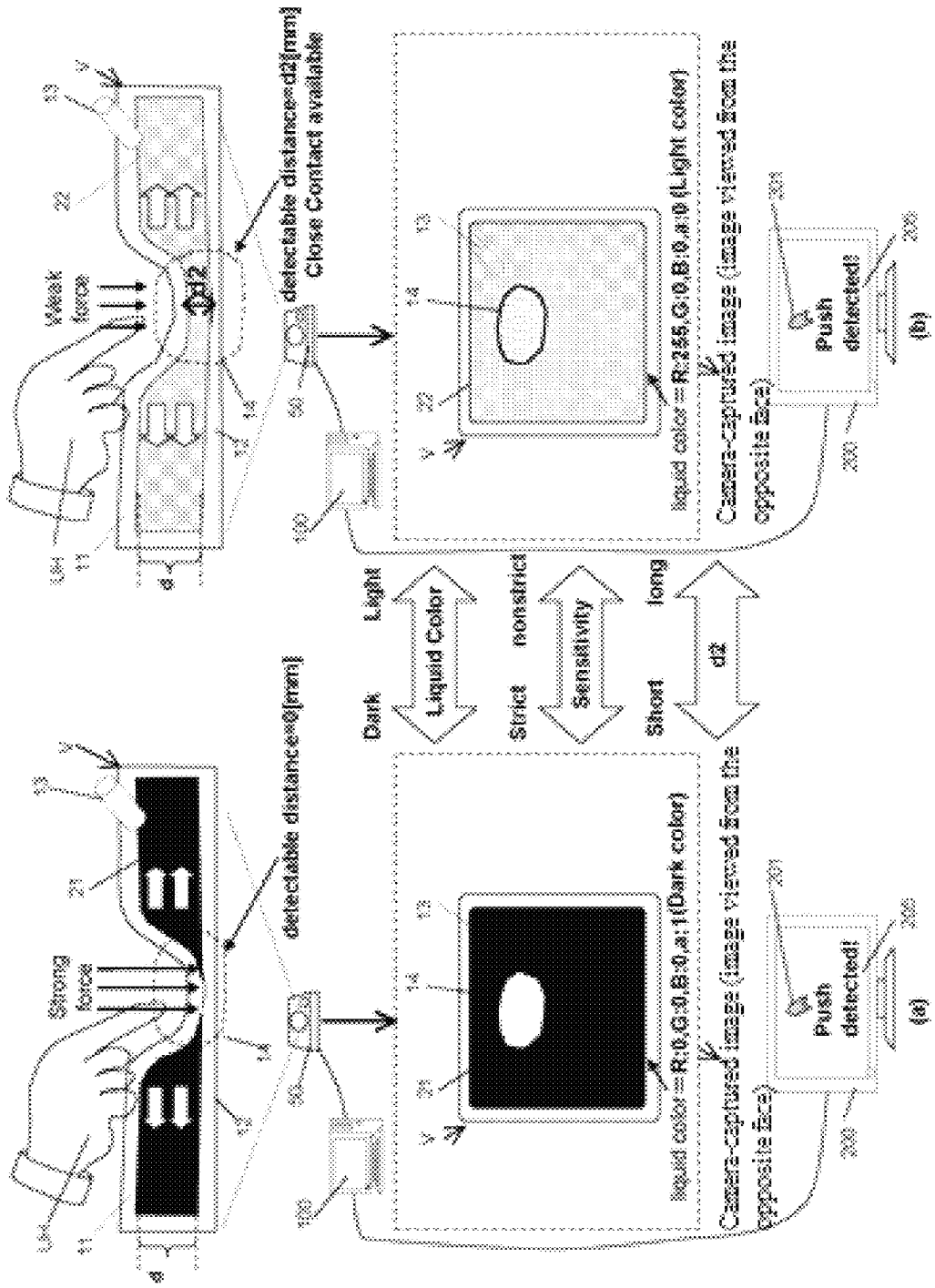

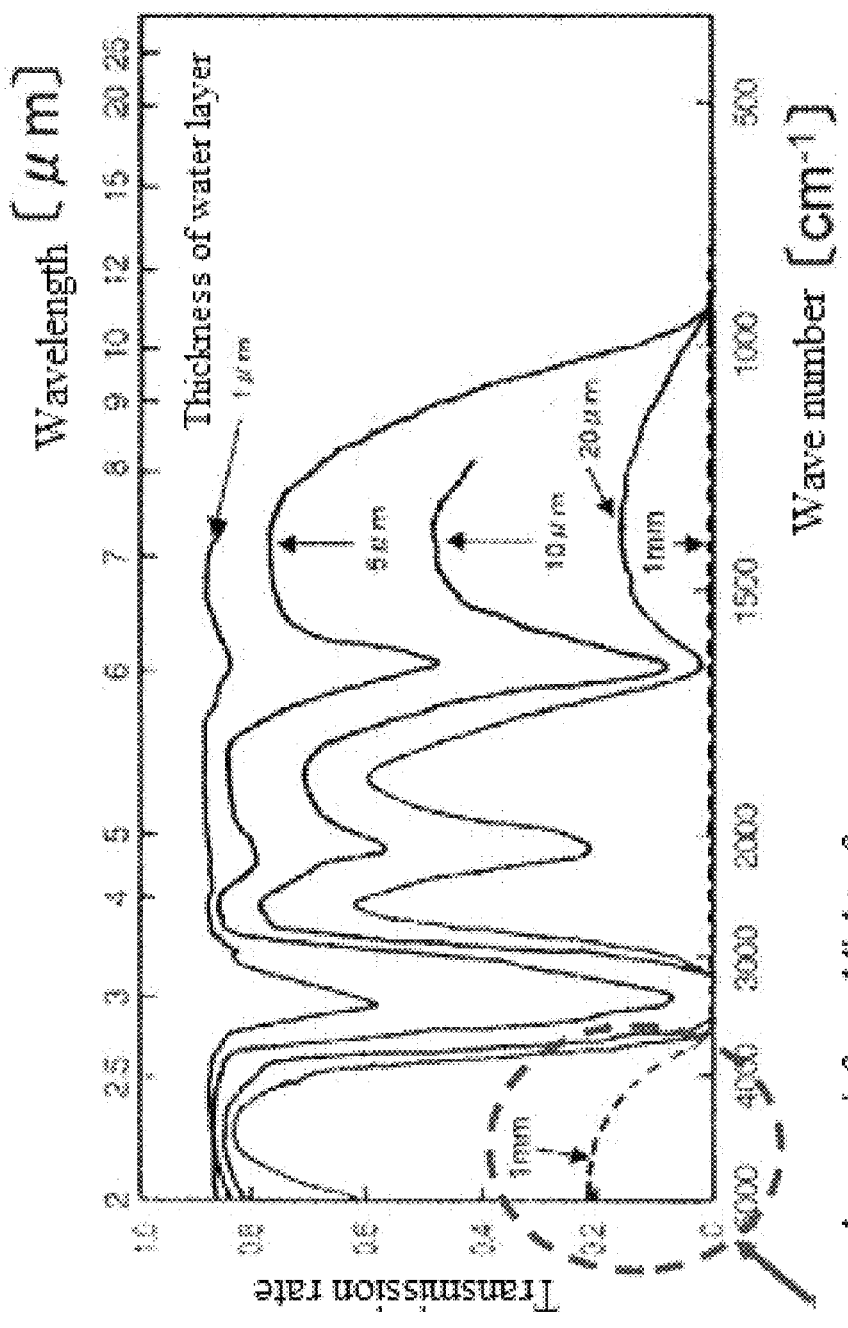

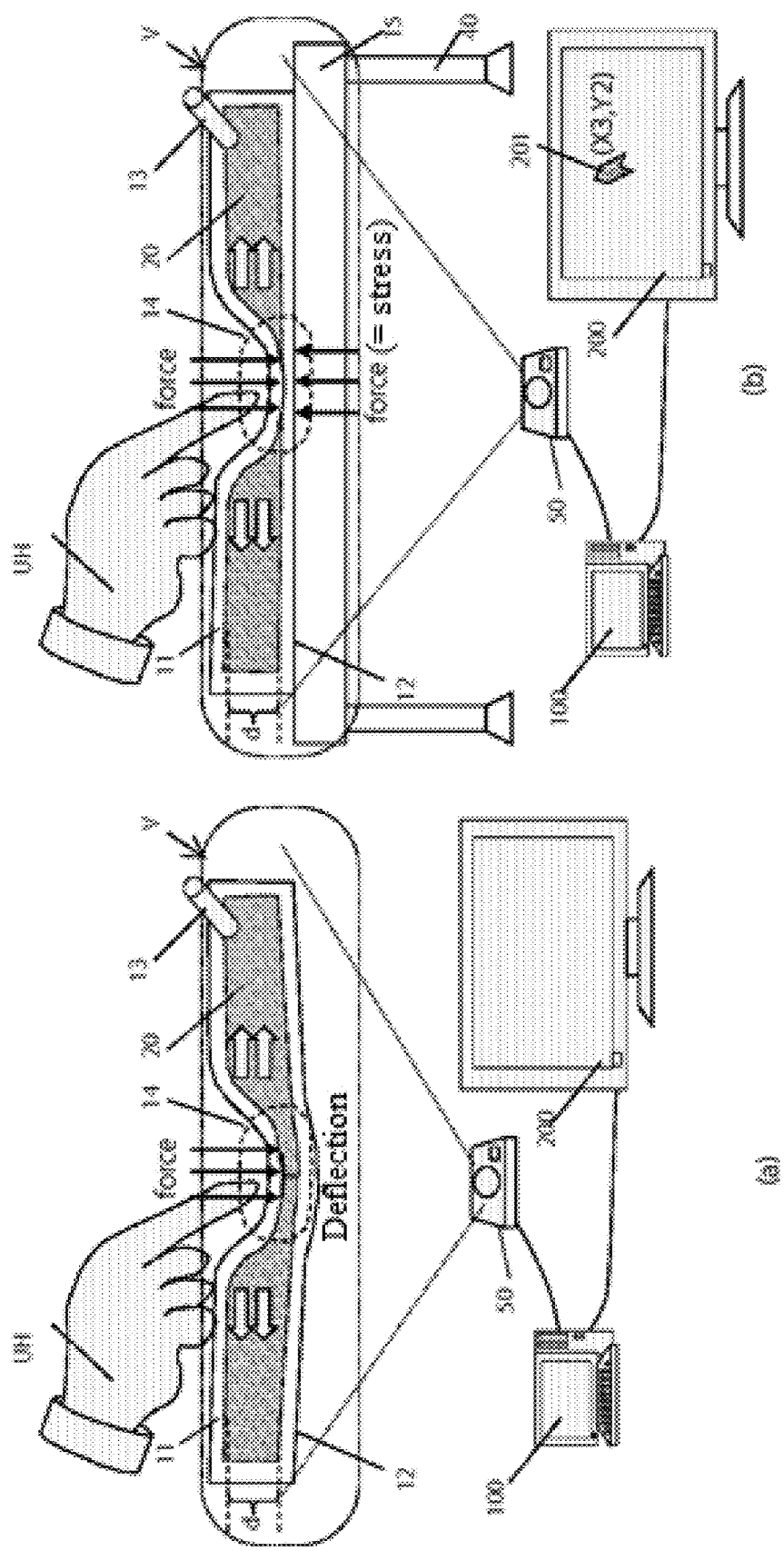
[FIG. 7]

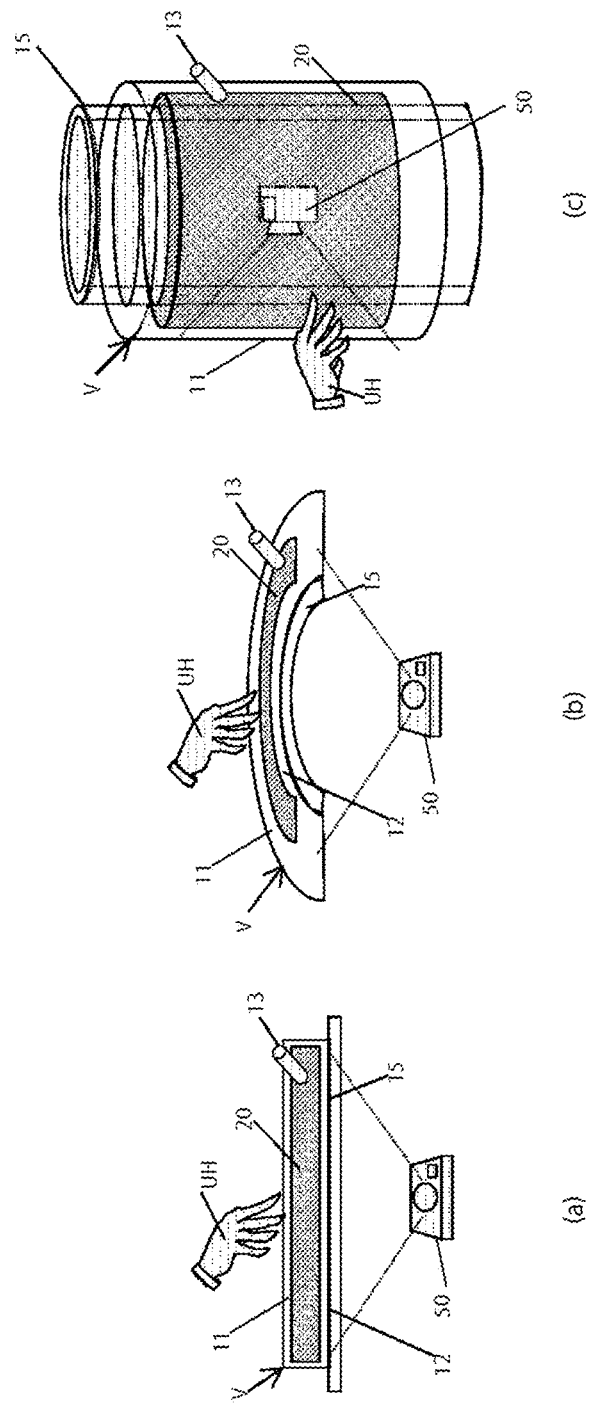
[FIG. 8]

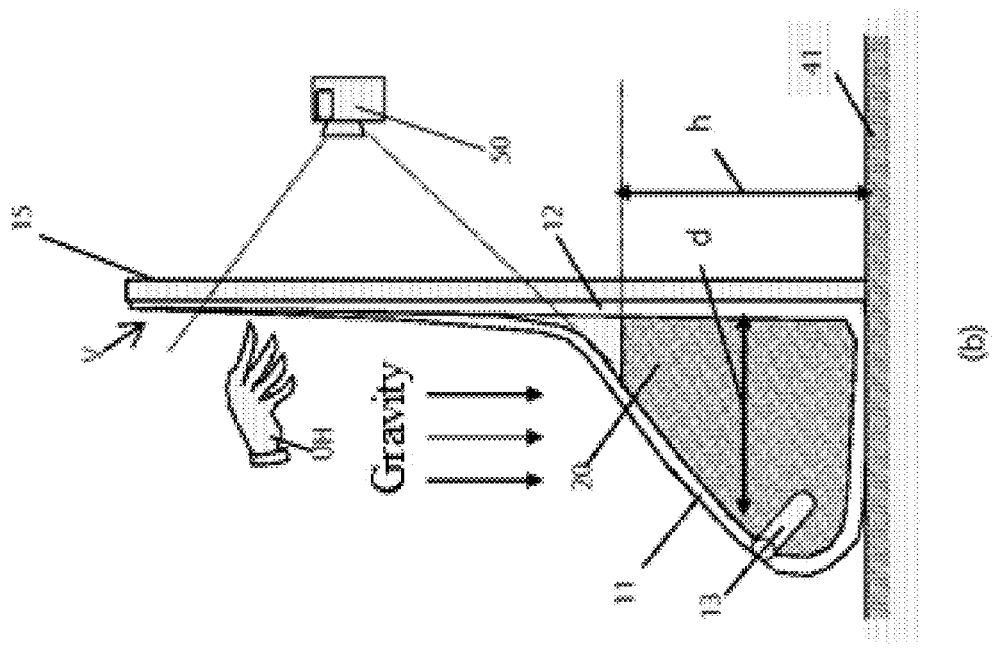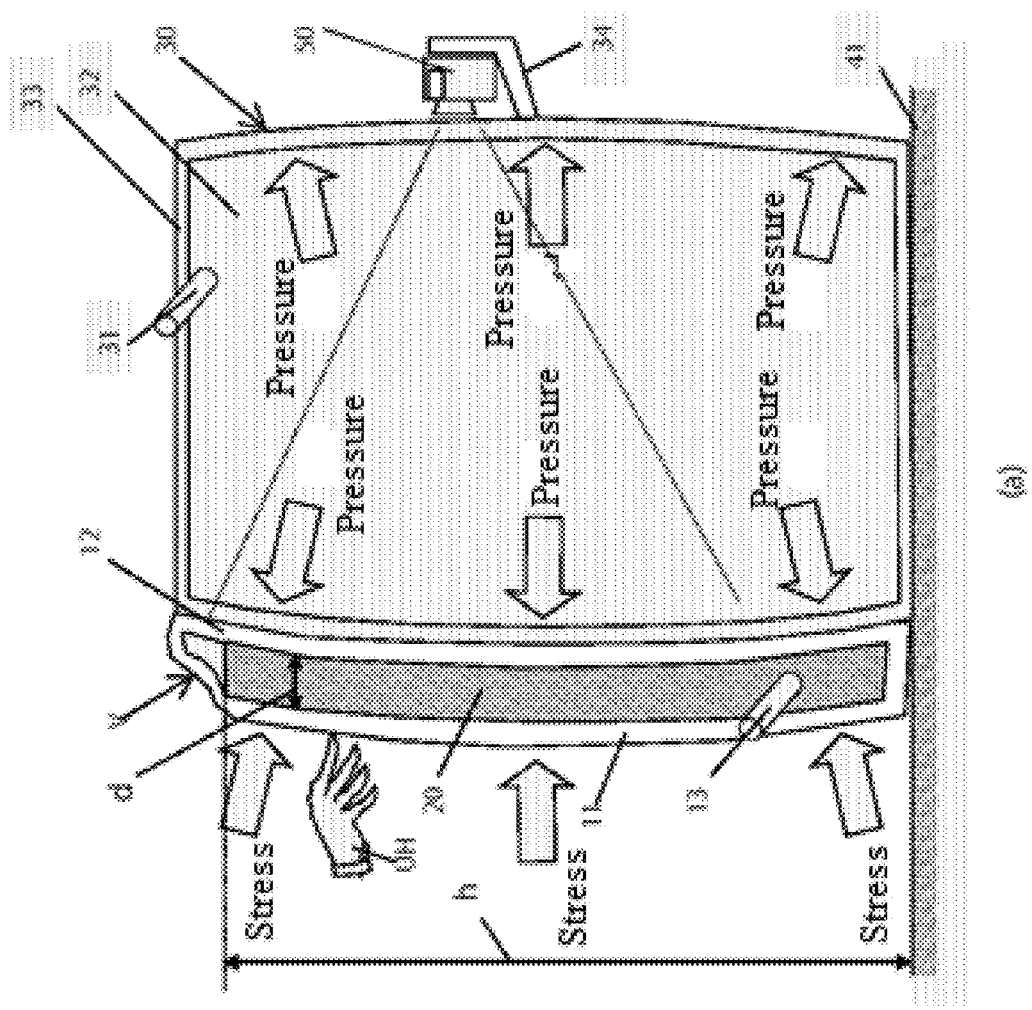
[FIG. 9]

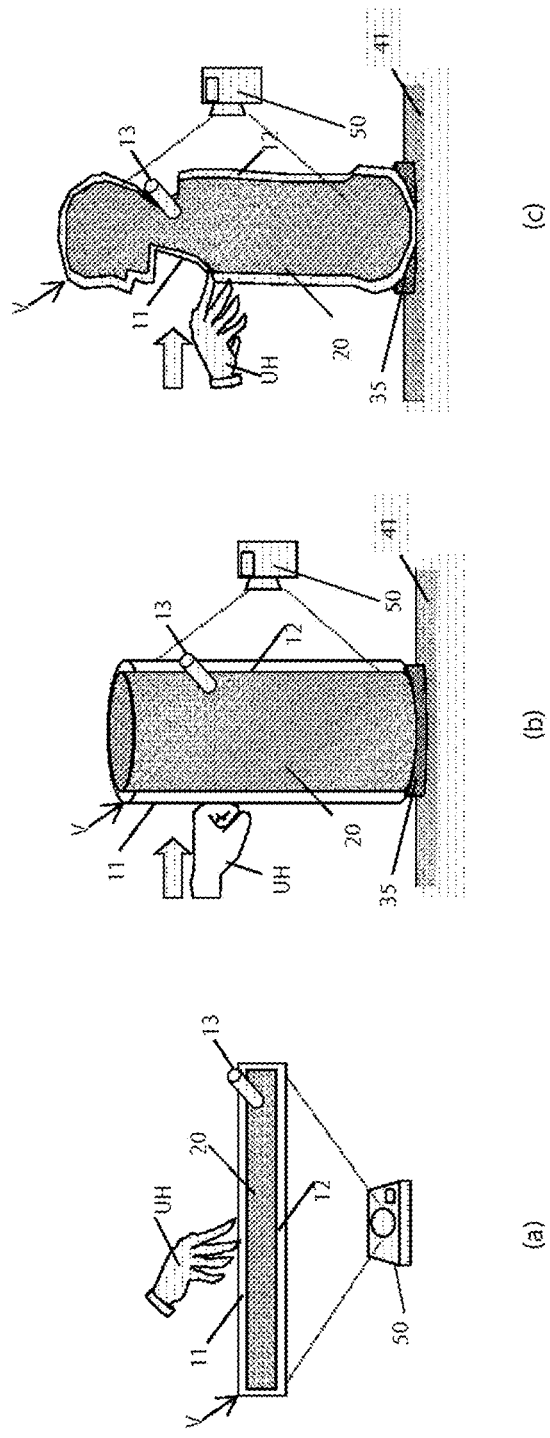
[FIG. 10]

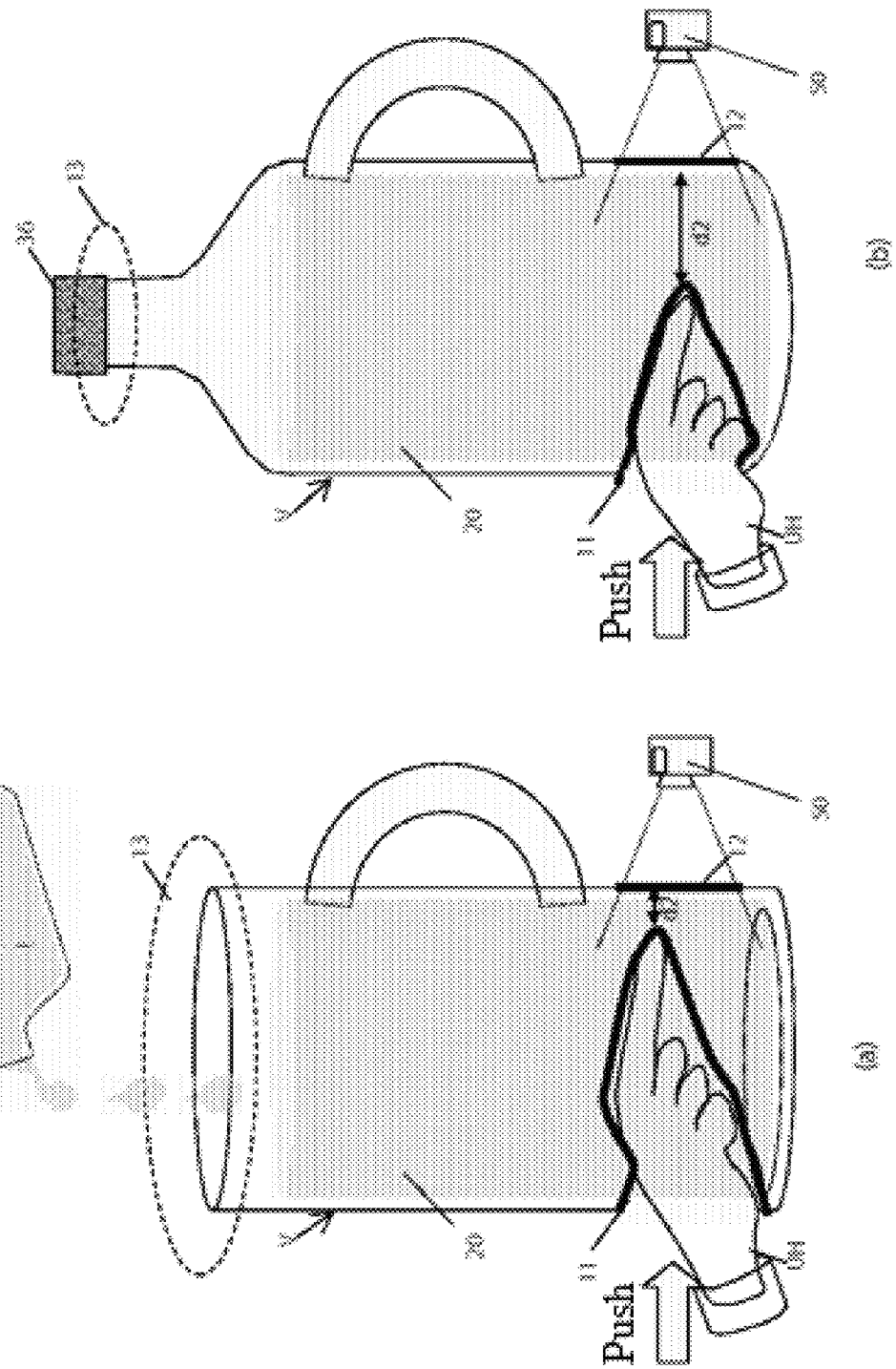
[FIG. 11]

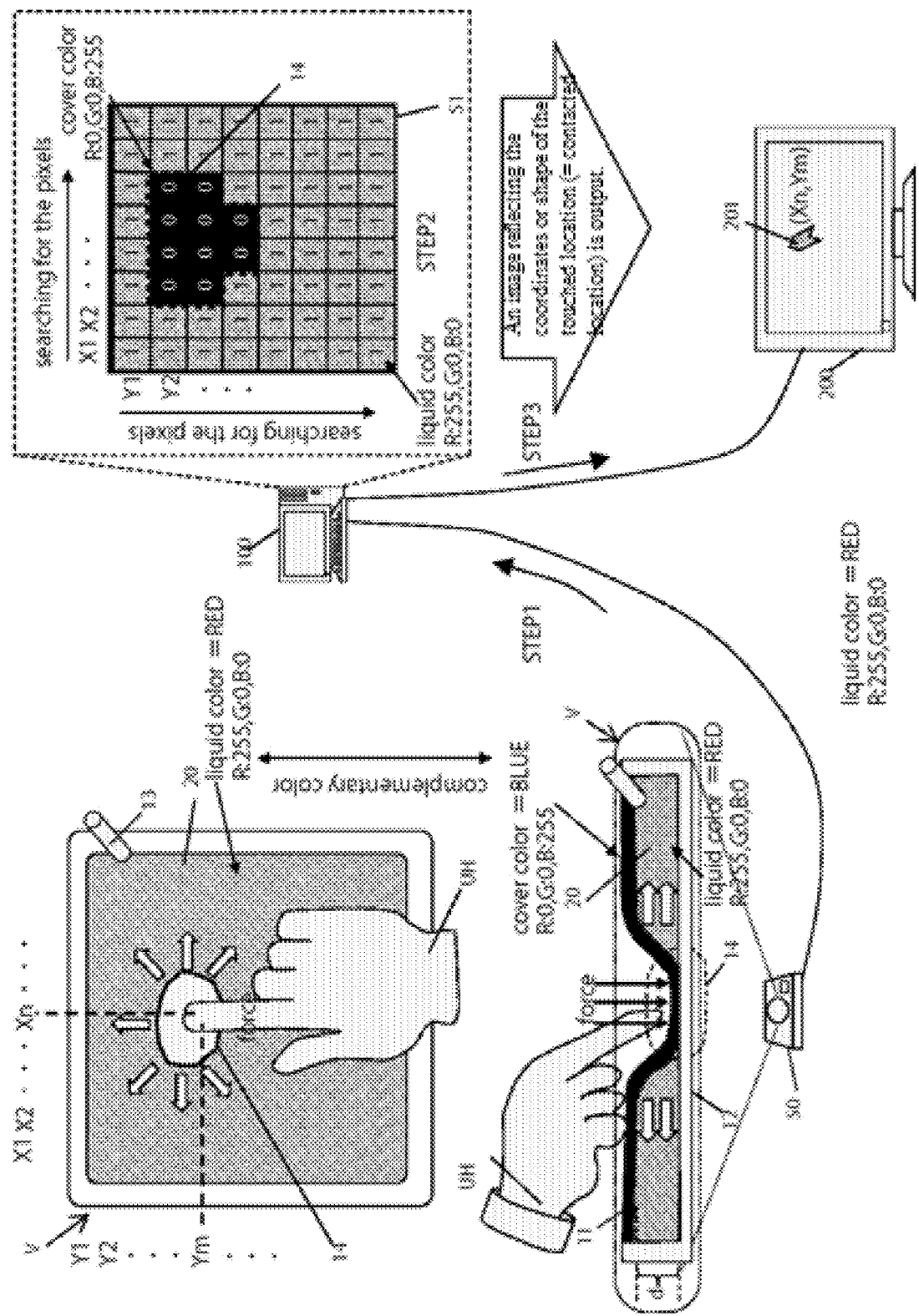
[FIG. 12]

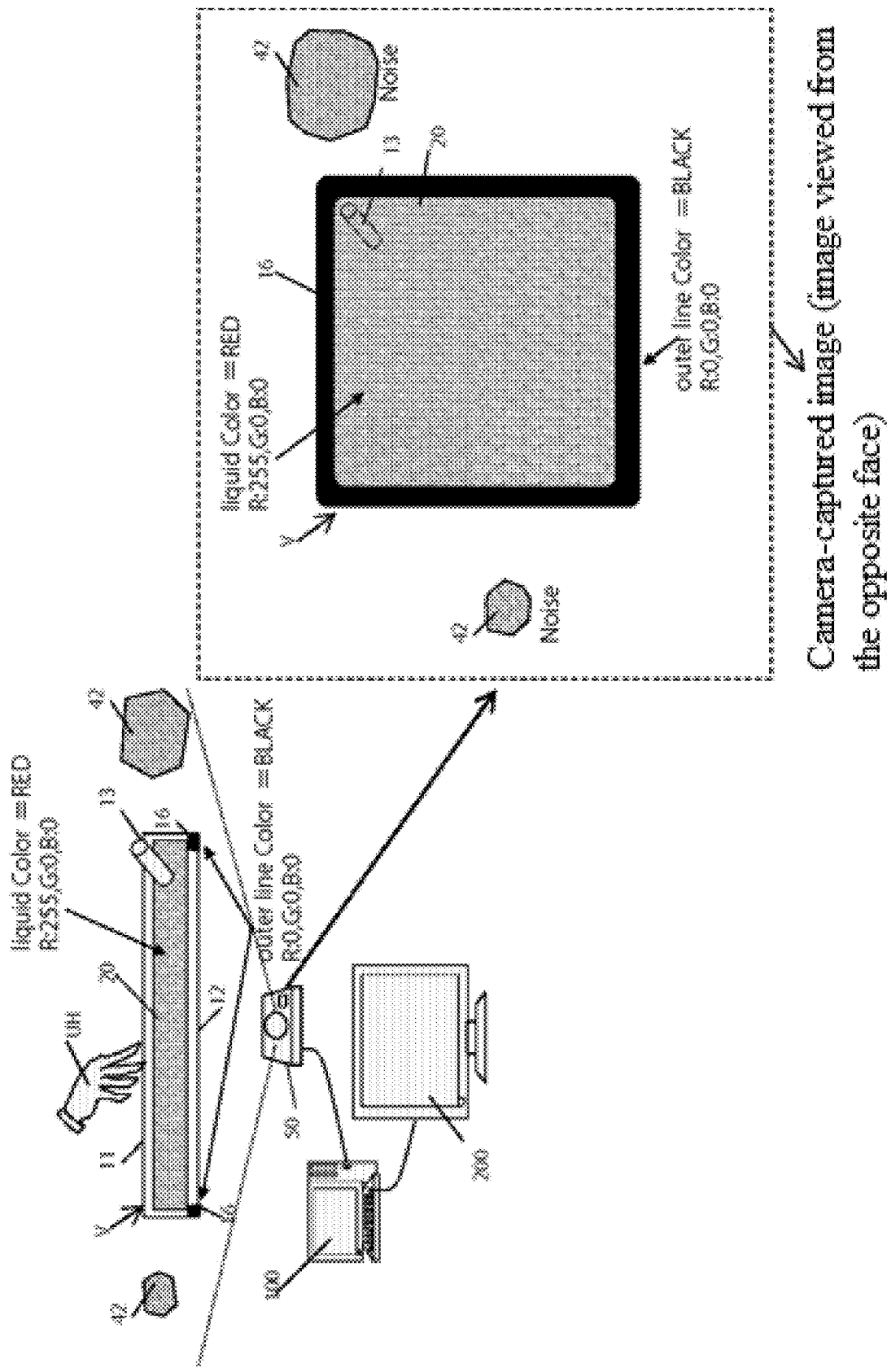
[FIG. 13]

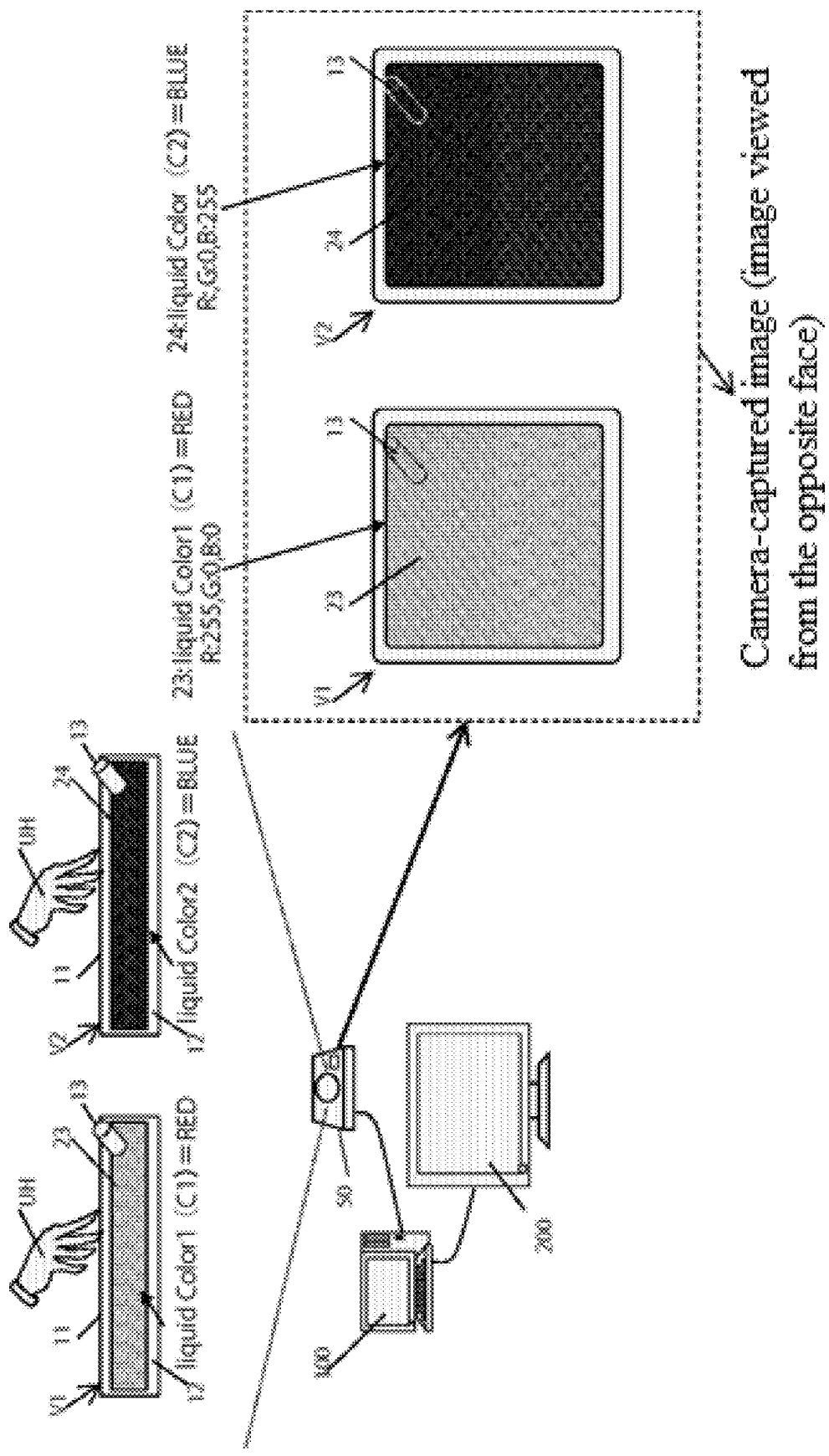
[FIG. 14]

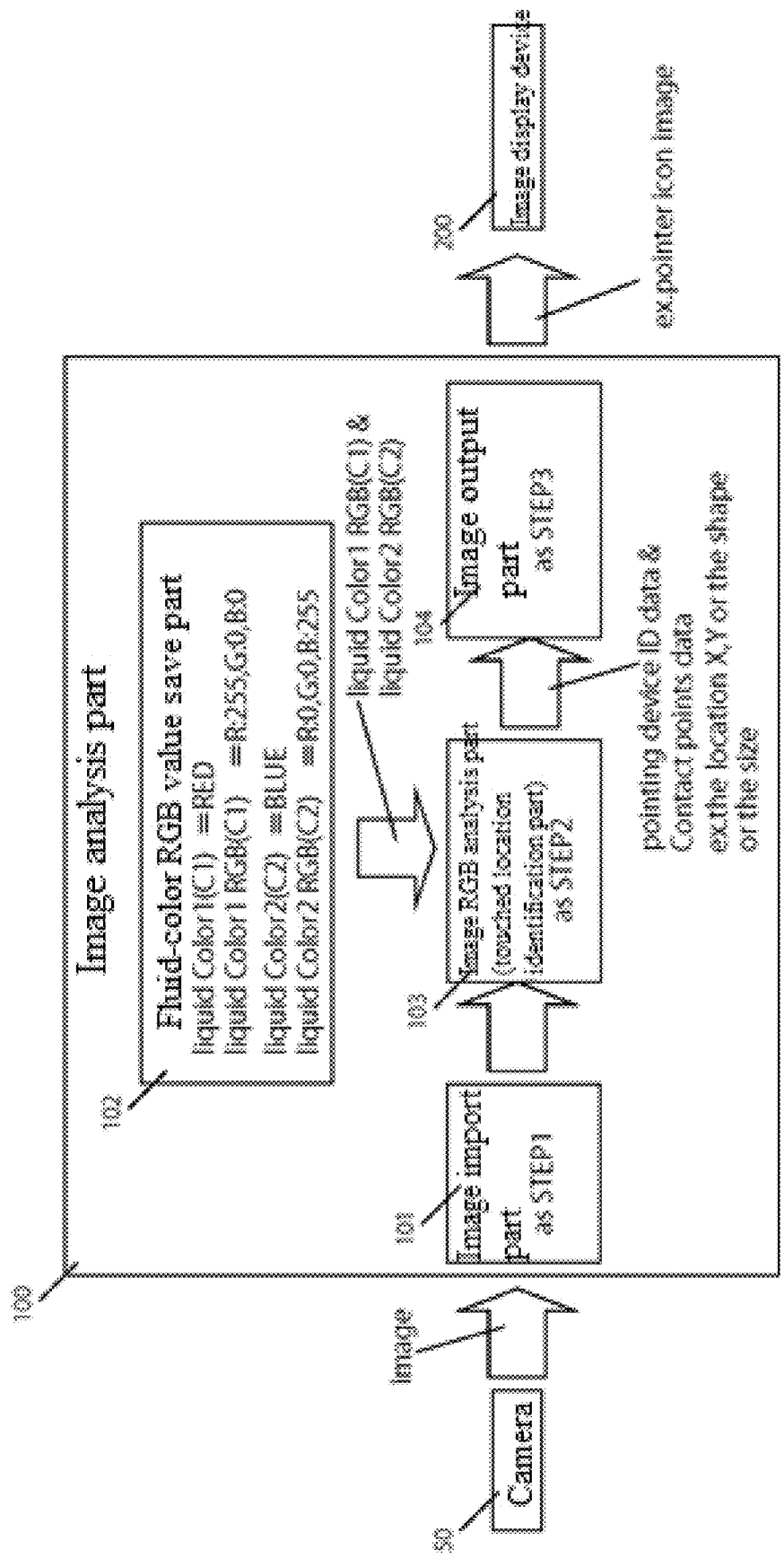
[FIG. 15]

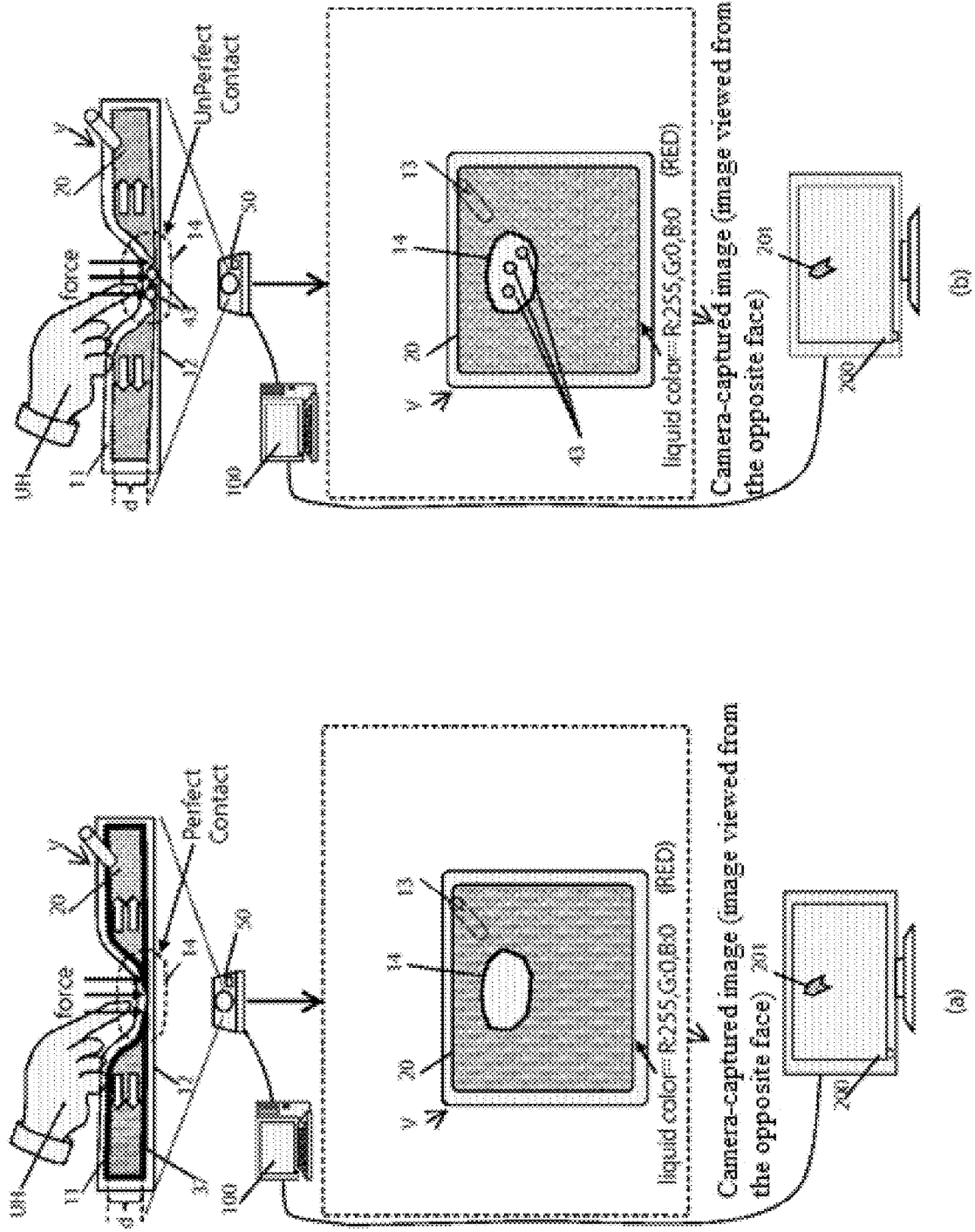
[FIG. 16]

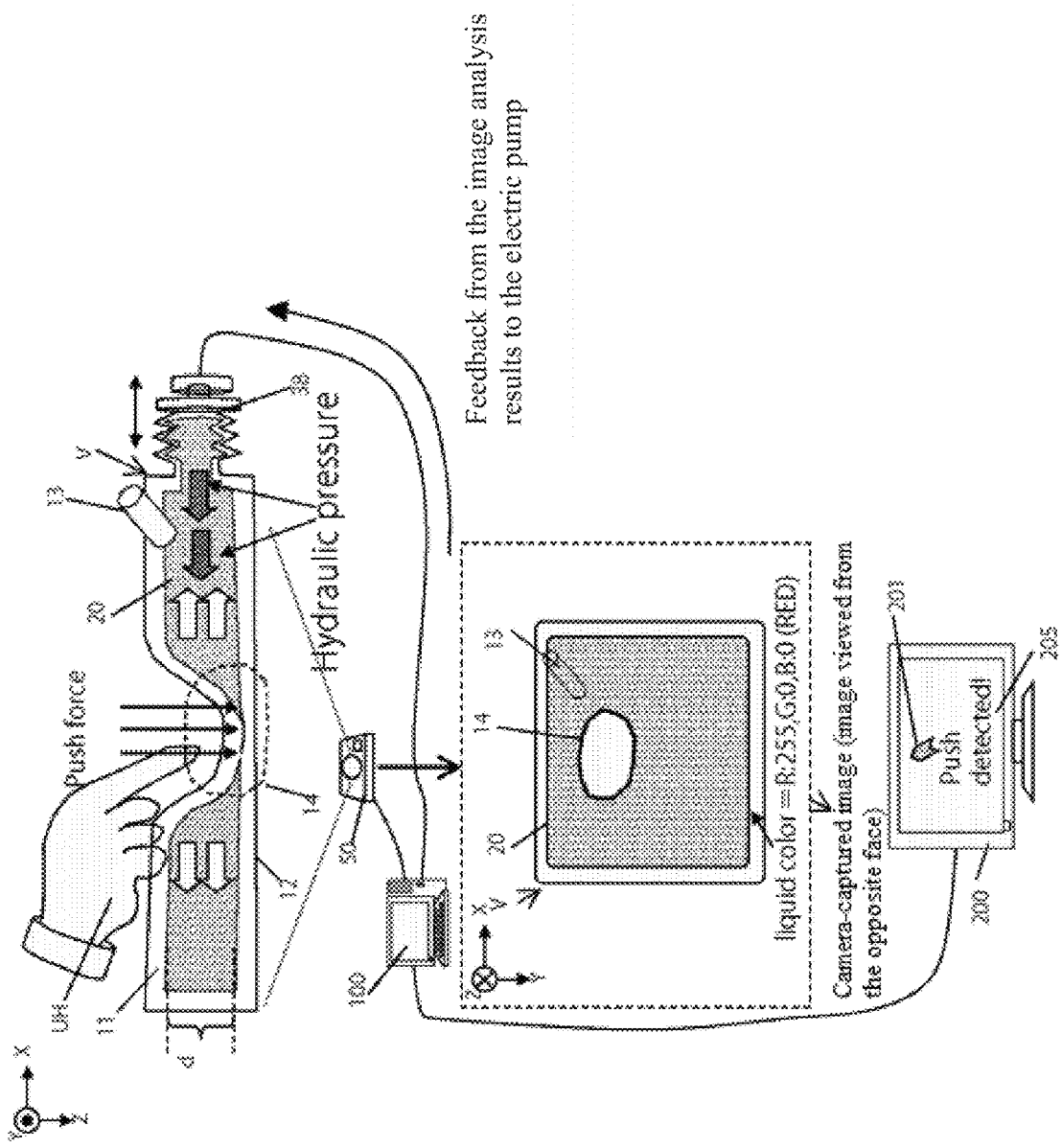
[FIG. 17]

[FIG. 18]
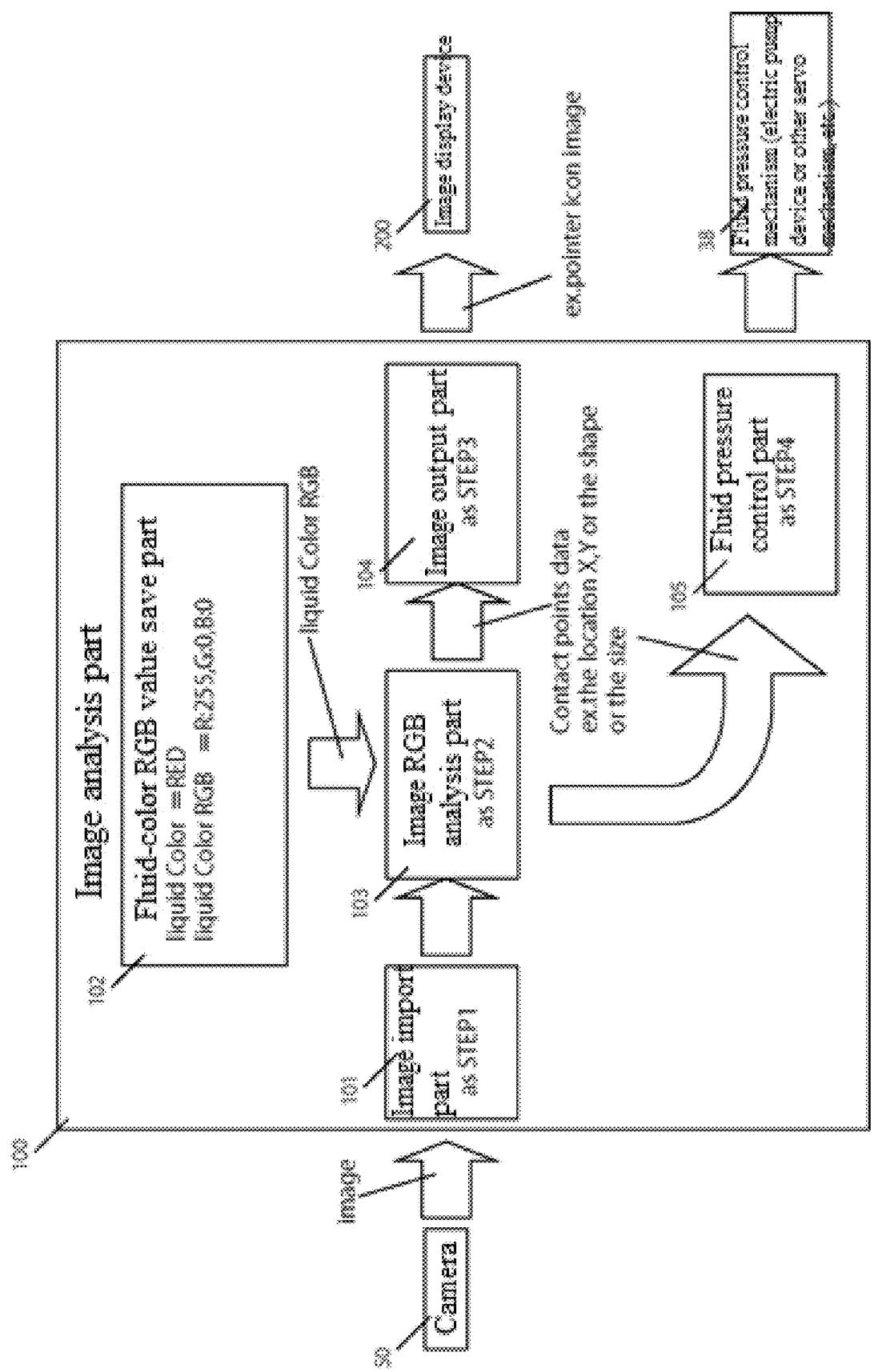

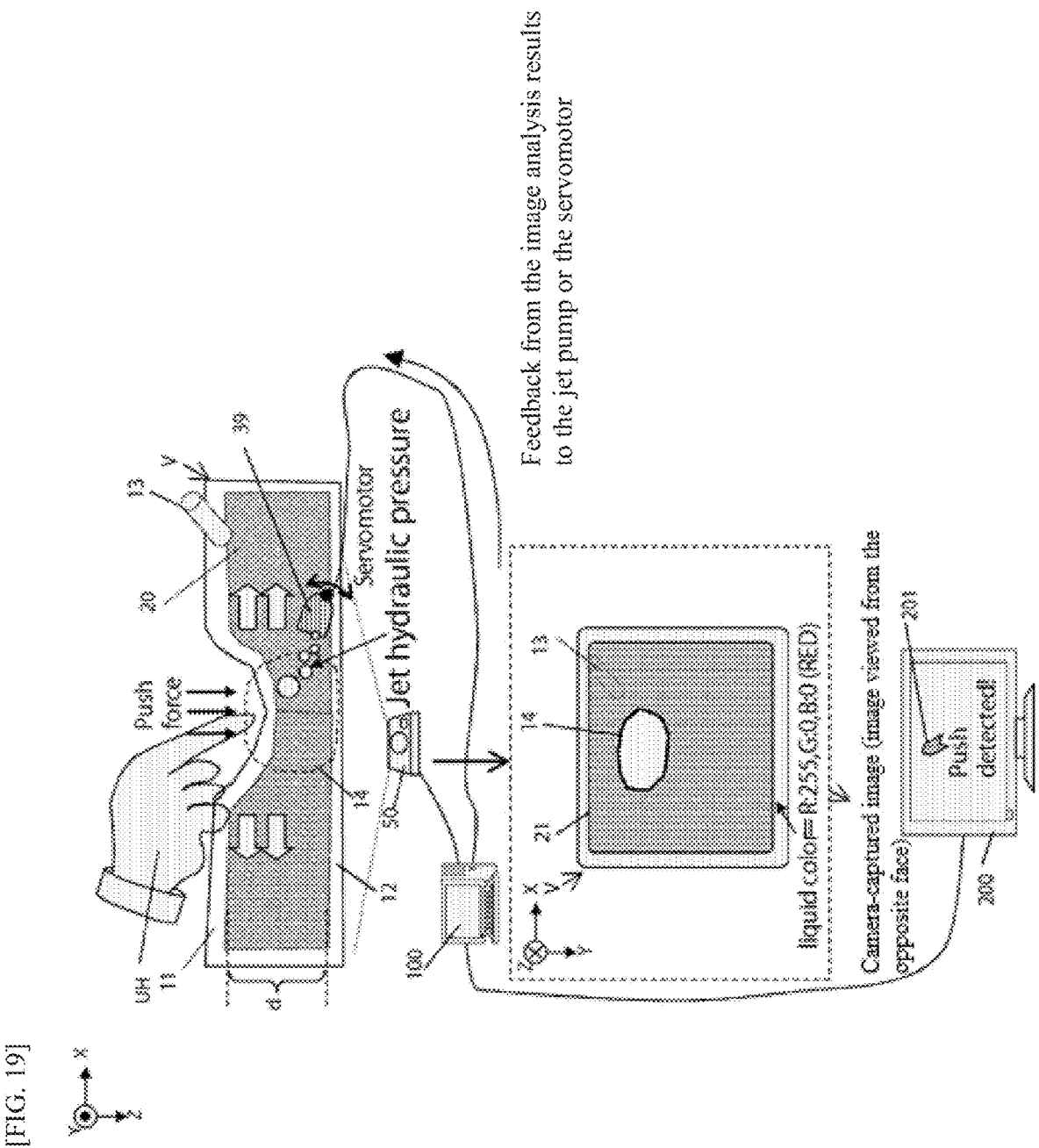
[FIG. 19]

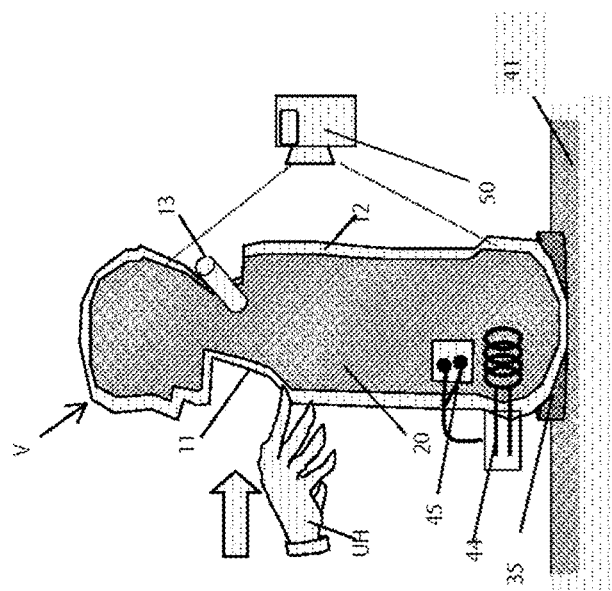
[FIG. 20]

[FIG. 21]
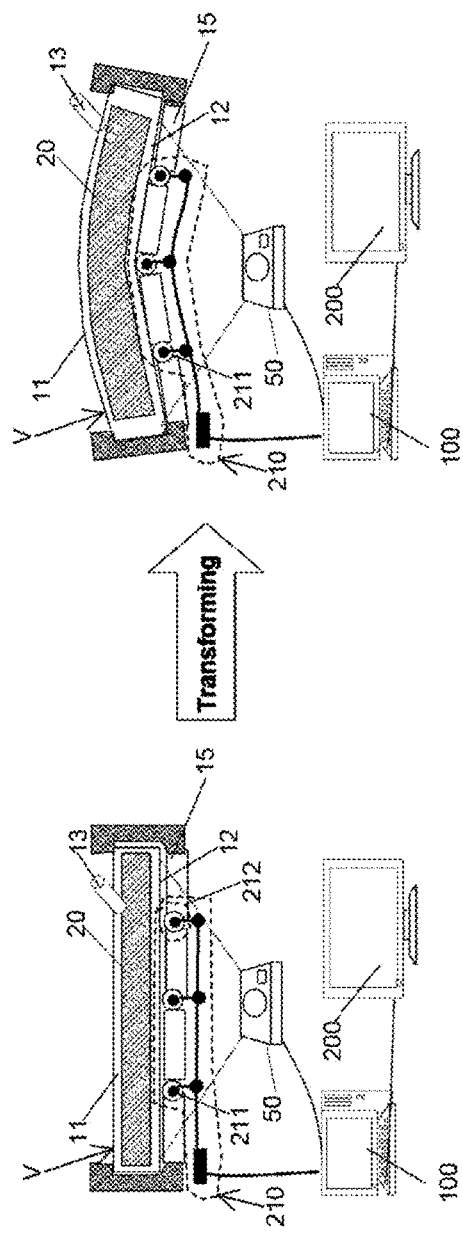

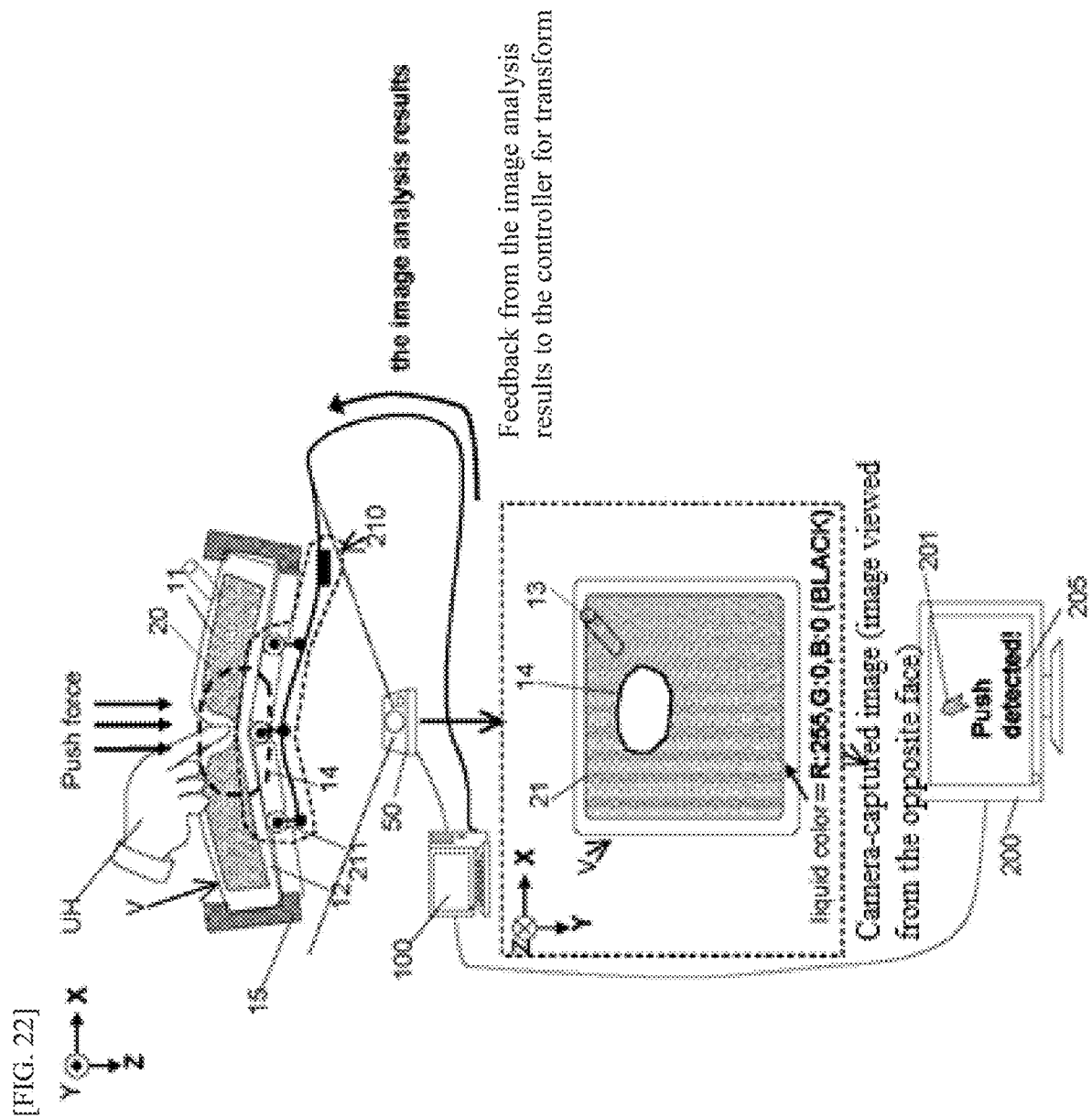
[FIG. 22]

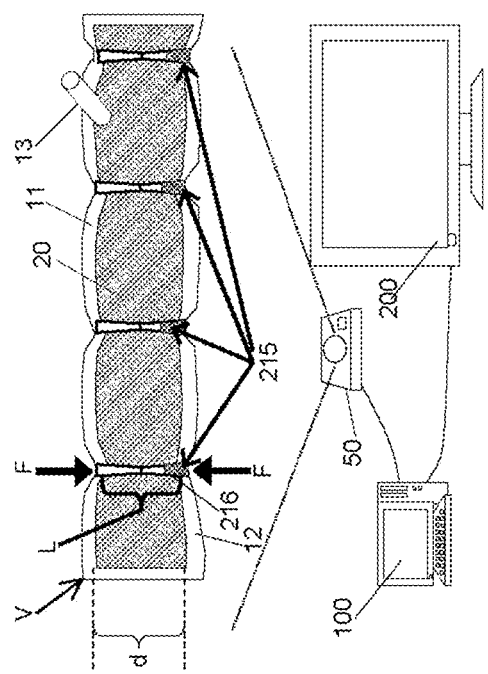
[FIG. 23]

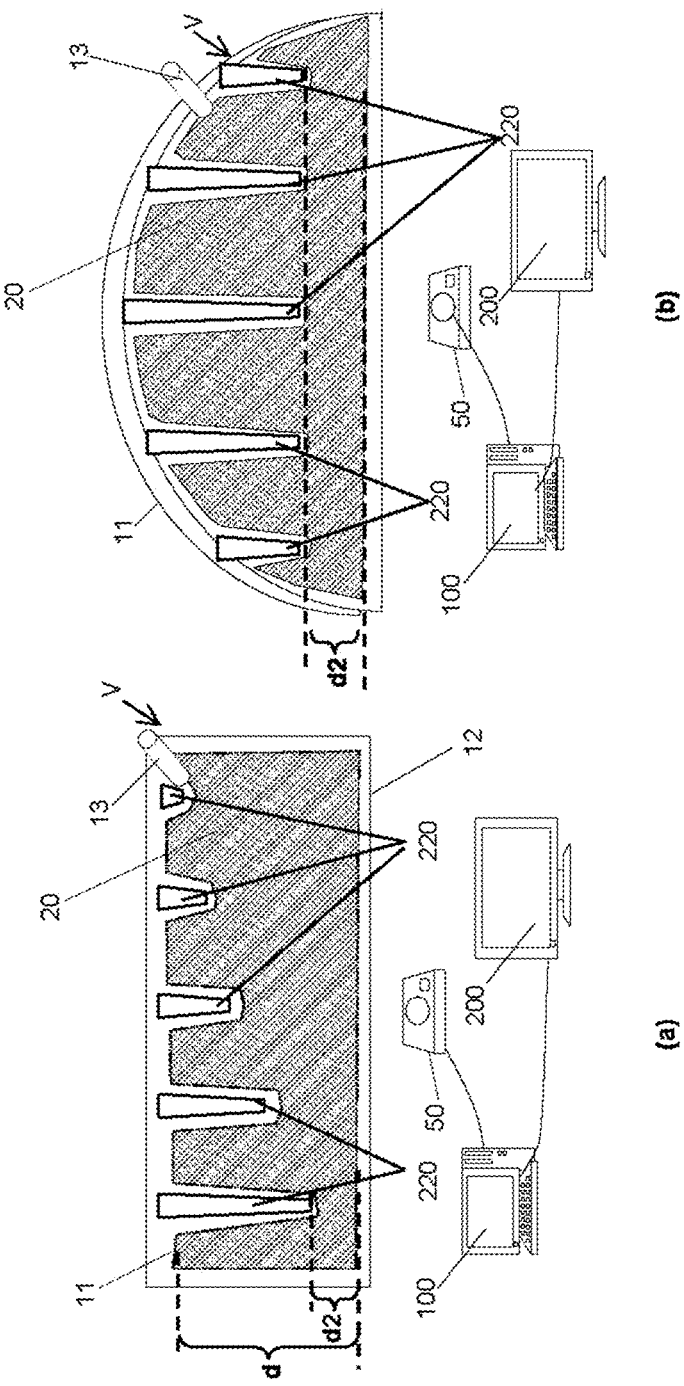
[FIG. 24]

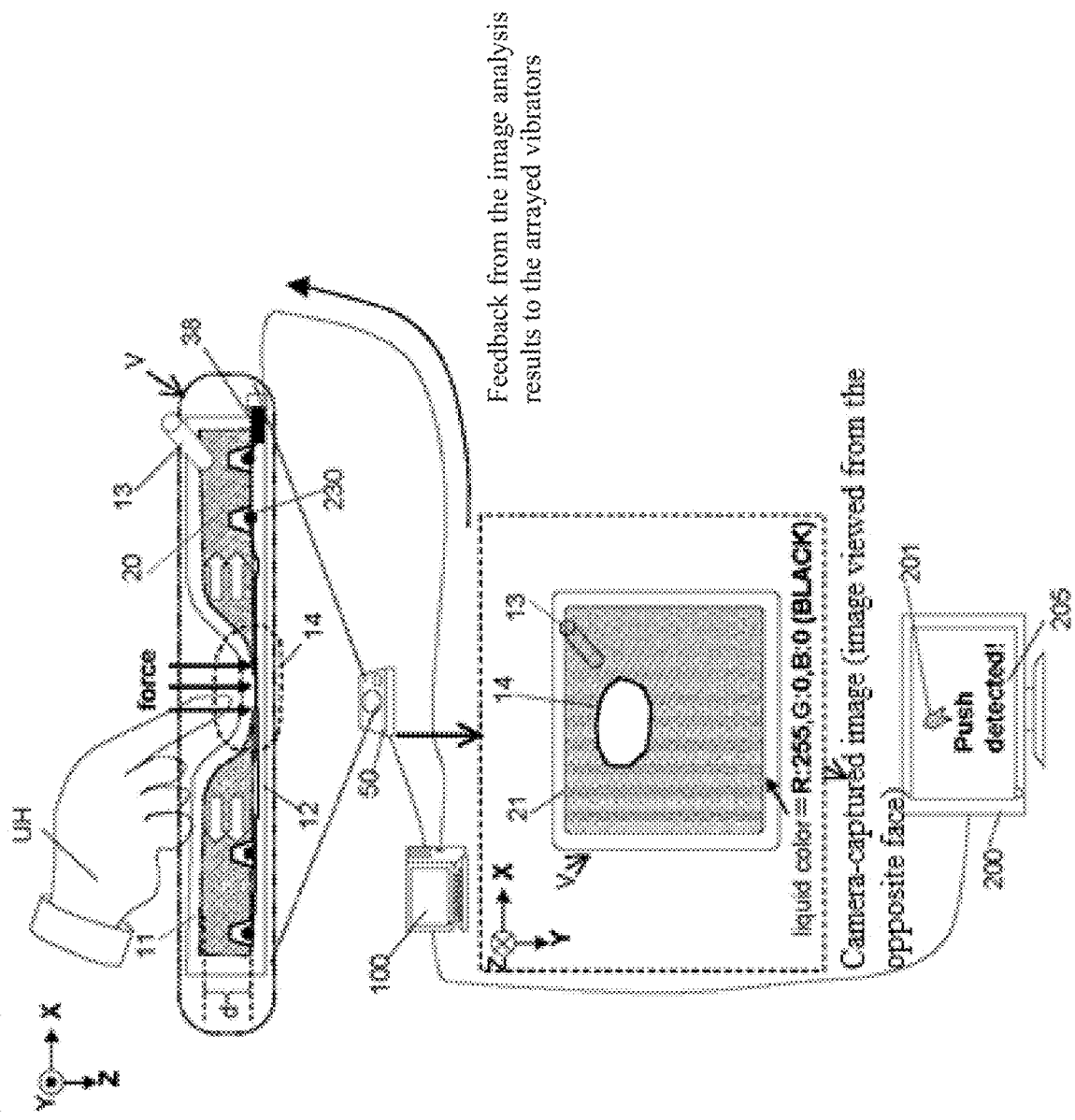

TOUCH PANEL SYSTEM

CROSS-REFERENCE TO RELATED APPLICATIONS

This application is the U.S. National Phase under 35 U.S.C. § 371 of International Application PCT/JP2019/012652, filed Mar. 26, 2019, which claims priority to Japanese Patent Application No. JP2018-059290, filed Mar. 27, 2018. The International Application was published under PCT Article 21(2) in a language other than English.

TECHNICAL FIELD

The present invention relates to a touch panel system containing a colored fluid inside to permit deformation to any shapes.

BACKGROUND ART

Computers, mobile information terminals and other electronic information devices incorporate touch panel systems that each combine an input device and a display device (display).

Touch panel systems of various methods are available, such as the capacitance type, resistive membrane type, ultrasonic surface acoustic wave type, and optical type (infrared optical imaging type).

For example, the capacitance type (refer to Patent Literature 1) works in such a way that a matrix electrode pattern is arranged inside a panel and when the user touches the panel with a finger, etc., the coordinates are detected based on the resulting change in capacitance.

Also, the resistive membrane type (refer to Patent Literature 2) works in such a way that voltage is constantly applied to both ends of two membranes arranged in a manner facing each other, and upon the user's touch, the coordinates are detected based on the resulting change in voltage at the position where the membranes have contacted each other.

Also, the inventor of the invention under the present application for patent had developed a touch panel system comprising a bag-shaped touch panel body containing a liquid, wherein an infrared thermography camera is used to sense the heat at the location touched by the user with a finger, etc., to identify the applicable coordinates (refer to Patent Literature 3).

BACKGROUND ART LITERATURE

Patent Literature

Patent Literature 1: Japanese Patent No. 5306059
Patent Literature 2: Japanese Patent Laid-open No. 2014-134454
Patent Literature 3: Japanese Patent No. 6086461

SUMMARY OF THE INVENTION

Problems to be Solved by the Invention

However, systems adopting the aforementioned capacitance type, resistive membrane type, ultrasonic surface acoustic wave type, and optical type (infrared optical imaging type) all have complex device constitutions and thus present such problems as high manufacturing cost and high failure rate. Another problem is that these systems cannot be used in a manner allowing the user to deform the touch panel to any shape during use.

The aforementioned art of using an infrared thermography camera presents problems in that it may not operate normally in a room whose temperature is close to the body temperature of the user because of the thermal noise attributable to the room temperature, and it cannot sense heat when touched by a stylus or other object that does not carry heat. Furthermore, it presents a problem in that, when the temperature of the liquid inside the touch panel body is close to the body temperature of the user, the infrared thermography camera cannot sense the location touched by the user with a finger, etc. Another problem is that the degree of force with which the user touches with a finger, etc., cannot be detected.

In light of the aforementioned problems, an object of the present invention is to provide a touch panel system which has a simple device constitution, is not easily affected by ambient temperature, can deform when in use, and also makes detectable the degree of force of touching with a finger, etc.

Also, another object of the present invention is to provide a touch panel system that allows the hardness and cushion property of the touched location to be changed in real time.

Means for Solving the Problems

The touch panel system proposed by the present invention comprises: a touch panel body part shaped like a bag, having a touch face made of a flexible material, and an opposite face of the touch face made of a material that transmits visible light, wherein a colored fluid is contained in the space sandwiched between the touch face and the opposite face; a camera capable of capturing light of visible wavelengths, for capturing the opposite face; and an image analysis part for analyzing the RGB values of pixels in an image captured by the camera; wherein such touch panel system is characterized in that: the camera captures, when an external force is applied to the touch face, the change in the color of the opposite face resulting from the touch face and the opposite face coming closer in distance and the fluid moving from this distance-reduced location; and the image analysis part calculates at least one of two things—coordinates of the distance-reduced location and shape of the distance-reduced location—based on the RGB value analysis results of the pixels in the image captured by the camera, and reflects the result in an image on an image display device.

Also, it is characterized in that the image analysis part calculates the reduced distance between the touch face and the opposite face at the distance-reduced location by comparing the RGB values of the fluid and the RGB values of the pixels in the captured image.

Also, it is characterized in that the color or transparency of the fluid can be changed.

Also, it is characterized in that the fluid is a liquid.

Also, it is characterized in that the fluid is viscous.

Also, it is characterized in that at least one of the touch face and the opposite face has a color different from that of the fluid.

Also, it is characterized in that a solid sheet-shaped object that transmits visible light is adhered to the opposite face.

Also, it is characterized in that the touch panel body part can be self-supporting.

Also, it is characterized in that the touch panel body part is a cylinder.

Also, it is characterized in that the touch panel body part is shaped to the likeness of a human body part.

Also, it is characterized in that the fluid is a drink, and the touch panel body part is a bottomed cylinder having a top opening.

Also, it is characterized in that the border part of the opposite face has a color different from the color of the fluid.

Also, it is characterized in that the surface contacted by the fluid, of at least one of the touch face and the opposite face, is water-repellent.

Also, it is characterized in that the touch panel body part has a transparent pocket for housing the camera.

Also, it is characterized in that it has a transparent cushion filled with air inside, and the touch panel body part is fixed on a side face of the cushion.

Also, it is characterized in that it has multiple touch panel body parts, and a fluid of a different color is contained in each of the touch panel body parts.

Also, it is characterized in that it has a fluid pressure control mechanism for controlling the pressure applied from the fluid to the touch panel body part, and the fluid pressure control mechanism changes the pressure based on at least one of two things—coordinates of the distance-reduced location and shape of the distance-reduced location.

Also, it is characterized in that the fluid pressure control mechanism has an electric pump, and the pressure is changed as a result of the electric pump pumping or discharging the fluid into/from the touch panel body part.

Also, it is characterized in that the fluid pressure control mechanism has a jet injection device, and the jet injection device injects a jet of the fluid toward the distance-reduced location.

Also, it is characterized in that it has a fluid temperature control mechanism for controlling the temperature of the fluid.

Also, it is characterized in that the fluid pressure control mechanism has multiple vibrators for vibrating the fluid and changes the pressure by vibrating the vibrators based on at least one of two things—coordinates of the distance-reduced location and shape of the distance-reduced location.

Also, it is characterized in that the image display device is a head-mounted display.

Also, it is characterized in that it comprises: an outer skeleton part having a transparent portion covering at least a part thereof, as well as a moving part; an electrical mechanism for deforming the shape of the outer skeleton part; and an outer-skeleton-part shape-control part for controlling the driving of the electrical mechanism to change the shape of the touch panel body part.

Also, it is characterized in that the outer-skeleton-part shape-control part changes the shape of the touch panel body part based on at least one of two things—coordinates of the distance-reduced location and shape of the distance-reduced location.

Also, the touch panel system is characterized in that it has multiple joining parts inside the space, for joining the touch face and the opposite face.

Also, the touch panel system is characterized in that it has multiple projecting parts oriented toward the space side from the touch face and/or opposite face.

Effects of the Invention

The touch panel system proposed by the present invention is such that, when the user presses the touch face with a finger, etc., and applies an external force, the touch face and the opposite face come closer in distance and the fluid moves from this distance-reduced location. As the fluid moves from the distance-reduced location, the color of the opposite face changes and this change in color is captured by the camera. The image analysis part calculates at least one of two things—coordinates of the distance-reduced location and shape of the distance-reduced location—based on the image captured by the camera, and reflects the result in the image on the image display device.

As described above, in principle the touch panel system proposed by the present invention does not generate noise due to heat, unlike those of the conventional method that use an infrared thermography camera to sense the heat from the user's finger, etc. This eliminates the possibility of malfunction even when the temperature of the ambient environment is close to the body temperature of the user.

Also, the coordinates, etc., of the distance-reduced location can be calculated even when an external force is applied by utilizing an object that does not carry heat, such as a stylus.

The present invention permits use of any general camera capable of capturing light of visible wavelengths, which makes the device constitution simple and presents such effects as low manufacturing cost and low failure rate.

Additionally, because the touch panel body part contains a liquid inside, a soft-to-touch touch panel can be obtained which, unlike the conventional touch panels, is easily deformable by the user according to the usage pattern.

If a wide-angle camera offering a wide angle of view is used, only one camera will do regardless of how large or small the area of the touch panel body part (area of the touch face and opposite face) is. Also, the cost associated with enlarging the touch panel body part can be kept low, compared to the conventional products that use piezoelectric elements.

In addition, constituting the opposite face also with a flexible material allows the touch panel body part to be compressed and stored by discharging the fluid inside the touch panel body part to the outside, which leads to higher portability.

Also, the image analysis part can calculate the reduced distance between the touch face and the opposite face at the distance-reduced location. Analysis by the image analysis part is done by comparing the RGB values of the fluid and the RGB values of the pixels in the image captured by the camera. In other words, the coordinates of the distance-reduced location, shape of the distance-reduced location and reduced distance can be identified only by filtering the pixels in the image captured by the camera using the RGB values of the color of the fluid, which reduces the computer loads and ensures high-speed operation even with low-speed ICs and CPUs, such as CPUs for mobile phones. Also, the reduced distance between the touch face and the opposite face can be calculated by comparing the RGB values of each pixel in the captured image and the RGB values of the color of the fluid to see how close they are, and the calculated reduced distance can be output to the image on the image display device as the "touch strength" with which the external force was applied to the touch face.

The color or transparency of the fluid can be adjusted in such a way that the difference between the RGB values of the fluid and the RGB values of the pixels in the image captured by the camera become clear. This way, a touch panel system can be obtained that responds to only a slight depression in the touch face through an application of external force, even when the touch panel body part has a thickness (distance from the touch face to the opposite face) of several tens of centimeters to several meters or so. Also, the distance (stroke distance) by which the finger, etc., moves after the touch face starts moving in the direction of the opposite face as an external force is applied by the finger, etc., until the image analysis part actually detects the touched state, can be adjusted arbitrarily through adjustment of the color or transparency of the fluid.

By adjusting the viscosity and quantity of the fluid, the softness of touch when the user touches the touch face, as well as the thickness and stroke distance, can be adjusted.

By coloring at least one of the touch face and the opposite face (touch face, for example) differently from the fluid and performing filtering using the RGB values of these two colors (color of the fluid and color of the touch face, for example), the accuracy of calculation of the coordinates of the distance-reduced location, etc., can be increased dramatically compared to when filtering is performed using only the RGB values of the liquid. Furthermore, correct operation of the touch panel can be ensured regardless of the color of the hand or skin, or race, of the user. Also, a state where the user is touching the touch face with a force weak enough not to cause it to contact the opposite face, or specifically a state between complete contact and non-contact, can be detected by acquiring, at the image analysis part, the pixels in intermediate color portions where the two colors are mixed.

This touch panel is such that its touch panel body part can be constituted entirely by a soft, flexible material, which means that, by adhering a transparent, solid outer skeleton to the touch panel body part, a touch panel having the shape of this outer skeleton can be produced with ease. In addition, because the outer skeleton is solid, stress generates in the outer skeleton at the location of the touch panel body part pushed by the user, which facilitates the discharge of the colored fluid from the pushed location and consequently increases the accuracy of identification of the position and shape of the pushed location, i.e., the touched location.

By structuring the touch panel body part so that it can be self-supported, or by fixing on a side face of the touch panel body part a transparent cushion filled with air inside, the fluid in the touch panel body part can be retained in the perpendicular direction, and accordingly the touch panel body part can be used at any angles, including one corresponding to the vertical direction to the ground.

The touch panel body part may be shaped as a cylinder or in the likeness of a human body part.

By using a carbonated drink, alcoholic drink or other drink as the fluid and shaping the touch panel body part as a bottomed cylinder having a top opening, such as a glass or bottle, the touch panel function can be added to such glass or bottle.

By giving the border part of the opposite face a color different from the color of the fluid, the range surrounded by the border part can be recognized as the opposite face 12 in RGB analysis, even when an object of the same color as the fluid 20 is reflected in the image captured by the camera 50, and therefore the object of the same color as the fluid can be eliminated as noise, the result of which is improved accuracy.

By adding water-repellency to the surface contacted by the fluid, of at least one of the touch face and the opposite face, a situation can be prevented where water droplets remain in the distance-reduced location due to the action of surface tension, etc., and consequently the accuracy of image analysis can be increased.

Providing the touch panel body part with a pocket for housing the camera eliminates the need for a mechanism for supporting the camera. Also, making the pocket transparent prevents the pocket from being reflected in the captured image when the opposite face is captured while the pocket is not in use.

Also, this touch panel uses a standard camera capable of acquiring the RGB values of colors, which means that, when multiple touch panels are used simultaneously, these multiple units of identical touch panels can be discriminated and used under assigned IDs simply by filling different colored fluids into these touch panel body parts and performing filtering using the RGB values of these colors during image analysis.

By changing the pressure of the fluid using an electric pump or jet injection device as a fluid pressure control mechanism, the hardness or touch quality felt by the user upon touching the touch face can be changed.

Also, the temperature of the fluid may be adjusted, using a fluid temperature control mechanism, to a level near human body temperature, for example.

Since the touch panel body part is flexible, there is little chance that the user will hit the touch panel body part and get injured or cause damage to the touch panel body part, even when a head-mounted display or other image display device is used that makes it difficult for the user to see the surroundings, the result of which is increased safety.

An outer-skeleton-part shape-control part, if provided, allows the shape of the touch panel body part to be changed using an electrical mechanism.

Also, by providing joining parts for joining the touch face and the opposite face, the distance between the touch face and the opposite face can be maintained roughly at a constant value over the entire range of the touch panel body part, even when the touch panel body part is tilted.

Also, provision of projecting parts allows the stroke distance to be changed.

Also, when vibrators are used as a fluid pressure control mechanism, energy consumption can be curtailed by vibrating only the vibrators near the distance-reduced location.

Since the touch face is flexible, the user can deform the touch face through a flexible display simply by closely placing the flexible display on the touch face. This way, a touch panel system for flexible displays can be obtained.

BRIEF DESCRIPTION OF THE DRAWINGS

FIG. 1 Drawings (a) and (b) showing the constitution of the body of the touch panel system FIG. 2 An example of algorithms for determining the coordinates of the distance-reduced position and shape of the distance-reduced location FIG. 3 A block diagram of the internal processing flow in the image analysis part FIG. 4 Examples of algorithms for determining the reduced distance by comparing the RGB values of the pixels in the captured image and the RGB values of the colored fluid to see how close they are FIG. 5 Explanations (a) and (b) of the principle behind why the stroke distance can be controlled freely by changing the transparency and color of the colored fluid FIG. 6 A graph showing the infrared absorption wavelength dependency of water FIG. 7 Examples (a) and (b) of a transparent sheet-shaped outer skeleton adhered to the opposite face of the touch panel body part FIG. 8 Examples (a) to (c) of transparent outer skeletons of various shapes adhered to the touch panel body part FIG. 9 A front view (a) of a touch panel body part having a cushion, and a front view (b) showing a condition where the touch panel body part is let stand without a cushion FIG. 10 Examples (a) to (c) of touch panel body parts of various shapes FIG. 11 Examples (a) and (b) of using drinking water as the fluid and shaping the touch panel body part as a bottle and a glass, respectively FIG. 12 An example of improving accuracy of touch detection by making the color of the touch face different from the color of the fluid FIG. 13 An example of improving accuracy by making the color of the border part of the opposite face different from that of the fluid FIG. 14 A drawing showing a condition where fluids of different colors are filled into multiple touch panel body parts FIG. 15 A block diagram of the internal processing flow when the image analysis part assigns IDs FIG. 16 Examples (a) and (b) of improving accuracy by applying a water-repellent material on the surfaces contacted by the fluid, of the touch face and the opposite face FIG. 17 An example of providing a fluid pressure control mechanism to permit control, via fluid pressure control, of the hardness and cushion property of the touch panel at touch FIG. 18 A block diagram of the internal processing flow when a fluid pressure control mechanism is provided FIG. 19 An example of permitting hardness and cushion property control at the distance-reduced position using a jet injection device FIG. 20 An example of making the fluid temperature adjustable using a fluid temperature control mechanism FIG. 21 An example of changing the shape of the touch panel body part using an outer-skeleton-part shape-control part FIG. 22 An example of the outer-skeleton-part shape-control part changing the shape of the touch panel body part based on at least one of two things—coordinates of the distance-reduced location and shape of the distance-reduced location FIG. 23 An example of arranging joining parts in the space inside the touch panel body part FIG. 24 Examples (a) and (b) of providing projecting parts of different lengths on the touch face FIG. 25 An example of arranging multiple vibrators inside the touch panel body part

MODE FOR CARRYING OUT THE INVENTION

First Embodiment

The first embodiment of the touch panel system proposed by the present invention is described below using drawings.

As shown in FIG. 1 to FIG. 3, the touch panel system 1 roughly comprises a touch panel body part V, a camera 50, and a computer as an image analysis part 100.

The touch panel body part V is a hollow member whose touch face 11 is made of a transparent flexible material, while its opposite face 12 is made of a transparent material that transmits visible light. The materials of the touch panel body part V are preferably, but not limited to, soft vinyl chloride, low-density polyethylene, and other transparent and flexible materials, for example. As described later, a fluid 20 is contained inside the touch panel body part.

The camera 50 may be any camera so long as it can capture still images or video images of light of visible wavelengths; however, the need for color analysis of the fluid 20 disqualifies night-vision system cameras and infrared thermography cameras for capturing ultraviolet light, infrared light and other invisible light.

It should be noted that, at a low illuminance, in a dark place, or when the ambient illuminance is otherwise insufficient and thus capturing the opposite face 12 is difficult, a camera 50 featuring a photomultiplier tube, avalanche photodiode, APD-COMS image sensor, or other mechanism for amplifying light of visible wavelengths should be used to make up for the lack of illuminance or light quantity. Also, an appropriate light source may be placed near the camera 50 to irradiate light onto the opposite face 12. In this case, desirably a planar luminous body is used as the light source whenever possible, because the capture accuracy will improve when the opposite face 12 is irradiated uniformly. Also, an organic electroluminescent or other planar, flexible luminous body may be attached to the touch face 11.

The image analysis part 100 may be any computer so long as it is capable of analyzing the colors (RGB values) of pixels in the image captured by the camera 50, where choices include not only standard personal computers, but also compact computers, IC chips, ASICs, etc., installed in mobile phone terminals.

The fluid 20 is water or other liquid, or viscous gel-like liquid, which has been colored and is contained inside the touch panel body part V. When the user's hand UH, etc., is placed on the touch-face side, with the opposite face 12 side facing the camera 50, the opposite face 12 is pseudo-colored by the color of the fluid 20, and this condition is captured by the camera 50.

The fluid 20 is filled into the touch panel body part V through its fill port 13. Also, by discharging the fluid 20 to the outside through the fill port 13, the touch panel body part V can be compressed and stored.

In this embodiment, the touch panel body part V has a quadrilateral shape in plan view; however, it may have a circular, triangular, pentagonal or other polygonal shape in plan view, or a shape whose cross-section along the perpendicular direction is a semicircle or a shape simulating the torso part of the human body, etc.

As shown in FIG. 1(b), when the user's hand UH touches the touch face 11 to apply an external force and bring the touch face 11 and the opposite face 12 closer in distance, a distance-reduced location 14 is formed. It should be noted that the touch face 11 and the opposite face 12 may come in contact. Since the fluid 20 in the distance-reduced location 14 moves to the surroundings, the distance-reduced location 14 of the opposite face as viewed from the camera 50 does not appear pseudo-colored by the color of the fluid 20, unlike in other areas. The present invention utilizes this principle to detect a user operation on the touch panel body part V. To be specific, the opposite face 12 including the distance-reduced location 14 is captured with the camera 50, as shown in FIG. 2, and based on the captured image 51, the image analysis part 100 determines, via RGB analysis, the pixels in the area not colored by the color of the fluid 20, or specifically the distance-reduced location 14. Then, the XY coordinates (coordinates of the distance-reduced location) and shape (shape of the distance-reduced location) of the relative position of the distance-reduced location 14 on the opposite face 12 are acquired and output as output values to, and reflected in, the XY coordinates and shape of the pointer image 201 in an external image display device 200.

A specific example of the internal processing by the image analysis part 100 is shown in FIG. 3.

First, in STEP 1, the captured image 51 of the opposite face 12 including the distance-reduced location 14, which has been captured by the camera 50, is imported into an image import part 101. In STEP 2 that follows, the RGB values of the color of the fluid 20, which have been saved in a fluid-color RGB value save part 102, are acquired by an image RGB analysis part 103 (in the example in FIG. 3, the color of the fluid 20 is red and its RGB values are R: 255, G: 0, B: 0), and these RGB values are used to filter the respective pixel values of the captured image in sequence. Then, the pixels in the area not colored by the color of the fluid 20 (pixels with RGB values other than R: 255, G: 0, B: 0 in the example in FIG. 3) are extracted and the coordinates within the captured image 51 as well as relative coordinates or shapes within the opposite face 12 are acquired for these pixels, which are then sent to an image output part 104 as coordinate or shape data of the area of the distance-reduced location 14.

Lastly, in STEP 3, the image output part 104 generates a pointer image, etc., to be output to the image display device 200 based on the coordinate or shape data of the area of the distance-reduced location 14, and this image is output to the image display device 200, upon which the processing ends.

It should be noted that, when only the position of the distance-reduced location 14 is required and its shape data need not be acquired, there is no need to filter all pixels in the captured image 51 in STEP 2, which means that the processing can be quickened substantially by acquiring and outputting the coordinates of the pixels other than those of the color of the fluid 20 as soon as such pixels are found. Also, while the color of the fluid 20 is assumed red and its RGB values are R: 255, G: 0, B: 0 for the sake of explanation in the example in FIG. 3, the color of the fluid 20 may be any other color.

Under the present invention, the user's hand UH placed on the touch face 11 side may sometimes appear colored by the color of the fluid 20 when viewed from the opposite face 12 side, or specifically from the camera 50; however, how intense the color appears to be depends on the distance between the touch face 11 and the opposite face 12 of the touch panel body part V. Utilizing this principle, the present invention can identify, and output to the image display device 200, how strong an external force was applied to the touch panel body part V (touch face 11) by the user's hand UH.

Specific examples are shown in FIG. 4. When the user's hand UH is applying a strong external force to the touch panel body part V and thereby causing the touch face 11 and the opposite face 12 to make contact, the distance between the touch face 11 and the opposite face 12 at the distance-reduced location 14 is zero and no fluid 20 is present in between. Accordingly, when the distance-reduced location 14 is viewed from the camera 50, as shown in FIG. 4(a), the color of the user's hand UH (in the example in FIG. 4, the color of the user's hand UH is assumed beige and its RGB values are R: 245, G: 245, B: 220) shows directly through the distance-reduced location 14. Also, a corresponding character string image 202 ("Strong Push!!") is output to the image display device 200.

On the other hand, when the user's hand UH applies to the touch panel body part V an external force weak enough to bring the touch face 11 and the opposite face 12 closer without making contact, the user's hand UH at the distance-reduced location 14 appears colored, to a certain degree depending on this reduced distance, by the color of this fluid when viewed from the camera 50, as shown in FIG. 4(b) (in the example in FIG. 4, the color is more reddish than beige and its RGB values are R: 250, G: 80, B: 80). Also, a corresponding character string image 203 ("Weak Push!") is output to the image display device 200.

Also, when no external force is applied to the touch panel body part V by the user's hand UH, the touch face 11 and the opposite face 12 are distant from each other and therefore, as shown in FIG. 4(c), the user's hand UH as viewed from the camera 50 appears completely colored by the color of the fluid 20 (in the example in FIG. 4, it is colored red, which is the color of the fluid 20, and its RGB values are R: 255, G: 0, B: 0). Also, a corresponding character string image 204 ("No Push!") is output to the image display device 200.

As described above, how close the original color of the user's hand UH is to the color of the fluid 20, or to be more exact how close the RGB values of the colors of the pixels in the area of the distance-reduced location 14 are to the RGB values of the color of the fluid 20, is determined by comparison, to estimate the degree of strength with which the user pushes the touch panel body part V (how much external force was applied to the touch face 11), and the result is output to the image display device 200.

The method of the present invention is to detect the distance-reduced location 14 by determining, through the camera 50, how much the opposite face 12 side is colored by the color of the fluid 20; accordingly, the sensitivity, or specifically the distance by which the finger, etc., moves from the touch face starts moving in the direction of the opposite face due to an application of external force until the image analysis part 100 actually detects the touched state (hereinafter referred to as "stroke distance"), can be adjusted arbitrarily by changing the color or transparency of the fluid 20.

Specific examples are shown in FIG. 5.

As shown in FIG. 5(a), when a fluid 21 of low transparency is used, such as Indian ink used in calligraphy, for example, the lowness of its transparency allows the user's hand UH to be visible from the camera 50 only when the touch face 11 and the opposite face 12 have a zero distance in between, i.e., when they are making full contact with each other. Accordingly, contact cannot be detected from the image captured by the camera 50 when the touch face 11 and the opposite face 12 only come closer. On the other hand, as shown in FIG. 5(b), use of a fluid 22 of high transparency, such as a light-colored juice or other liquid, makes the user's hand UH visible through this fluid 22 from the camera 50 when the touch face 11 and the opposite face 12 simply come closer to a certain distance (denoted as d2 in the example in FIG. 5). This means that contact can be detected even when full contact has not occurred at the distance-reduced location 14. In other words, by providing a fill port 13 through which the fluid 21 or 22 inside can be changed freely, the user himself/herself can easily and freely change or control the sensitivity of the touch panel system, or specifically the distance d2 (stroke distance) between the touch face 11 and the opposite face 12, by changing the fluid inside, through the fill port 13, to one of appropriate transparency or color.

Also, the stroke distance d2 can be set to an extremely long distance in the order of several tens of centimeters to several meters. For example, a fluid of high transparency (fluid close to highly transparent water) should be used if a stroke distance d2 setting in the order of several meters is desired, or a fluid of very low transparency should be used if a stroke distance d2 in the order of several millimeters or shorter is desired. As described above, under the present invention a touch panel body part of any sensitivity and any thickness can be obtained by adjusting the transparency or color of the fluid.

It should be noted that, although this has no direct relationship with the present invention, the touch panel adopting the method of capturing infrared light transmitting through the fluid, as disclosed in Japanese Patent No. 6086461 under [Patent Literature 3], only achieves a transmission rate of 0.2 or lower through water of 1 [mm] or greater in thickness, even when an infrared light of a wavelength shorter than 2.5 [μm] is used, as shown in FIG. 6. This means that the adjustment band for the stroke distance d2 can only be set in the order of several millimeters to several centimeters if infrared light is used, regardless of its wavelength. In other words, the method using infrared light makes it difficult to create a touch panel body part which is shaped extremely thick in the order of several tens of centimeters to several meters.

It should be noted that FIG. 6 is cited from the following papers: Atsuo Watanabe, Ken Shimizu, "*Shokuhin Kougyo ni okeru Denjiha no Chiyou* (1)" (Utilizing the Knowledge of Electromagnetic Waves in Food Industry), MOL Chemical Engineering Journal, pp. 120-128, February Showa 63 (1988); Koichi Takada, Yoshinobu Egawa, Hisao Sasaki eds.), Jitsuyou Ensekigaisen (Practical Far Infrared Light), Human & History Ltd., Feb. 27, 1992, First Print of First Edition; and http://www.nippon-heater.co.jp/wp-content/themes/JapaneseHeater/designmaterials/pdf/infrared.pdf.

Furthermore, since the fluid used under the present invention only needs to have color, a juice, beer or other colored drink can be used, for example; accordingly, the touch panel body part V may be shaped as a drinking water glass or bottle, which is described in detail later.

It should be noted that, while the explanations in this Specification use a user's hand UH as the means for applying an external force to cause the touch face 11 and the opposite face 12 to make contact, the means may be something else, such as a bar-shaped object, stylus, etc.

Lastly, as an additional explanation about the color of the touch face 11, the present invention adopts the method of detecting the distance-reduced location 14 by determining, through the camera 50, how much the opposite face 12 side is colored by the color of the fluid 20, as described above, which means that the touch face 11 operates fully regardless of whether it is transparent or colored and, by leaving the detailed explanations to other examples later, it is simply stated here that the accuracy of this touch panel system can be increased by coloring the touch face 11 with a complementary color (contrast color) to the color of the fluid 20.

Second Embodiment

Next, the second embodiment of the present invention is explained, where attention is drawn to the fact that those locations constitutionally identical to their counterparts in the aforementioned embodiment are denoted by the same symbols and not explained.

As shown in FIG. 7(*b*), a solid sheet-shaped outer skeleton part 15 made of a transparent material that transmits visible light may be adhered to the opposite face 12 of the touch panel body part V. If the material of the opposite face 12 is flexible, pushing of the touch face 11 by the user's hand UH causes the external force to transmit through the fluid 20, resulting in the opposite face 12 also deflecting, as shown in FIG. 7(*a*). This gives rise to a possibility that the fluid 20 between the touch face 11 and the opposite face 12 is not displaced properly and normal detection of the distance-reduced location 14 is hindered. When the sheet-shaped outer skeleton part 15 is adhered to the opposite face 12, as shown in FIG. 7(*b*), the action of the outer skeleton part 15 causes a suitable stress to generate in the opposite face 12 when the user's hand UH pushes the touch face 11, allowing for proper displacement of the fluid 20 between the touch face 11 and the opposite face 12. This ensures normal detection of the distance-reduced location 14, improving detection accuracy. Also, when table leg parts 40 are provided on the outer skeleton part 15 to let the outer skeleton part 15 function as a tabletop, a table-shaped touch panel system can be obtained.

The material of the outer skeleton part 15 may be any transparent, solid material that does not interfere with image-capturing by the camera 50, such as glass, acrylic, polycarbonate, etc.

Also, touch panels of various shapes can be obtained by adhering outer skeleton parts 15 of various shapes to the opposite face 12 of the touch panel body part V, as shown in FIG. 8.

For example, a curved touch panel can be obtained by using an outer skeleton part 15 of curbed shape and adhering the opposite face 12 of the touch panel body part V to it, as shown in FIG. 8(*b*). Similarly, a touch panel of cylindrical shape can be obtained by using an outer skeleton part 15 of cylindrical shape and adhering the opposite face 12 to it, as shown in FIG. 8(*c*). It should be noted that, to capture the opposite face 12 and distance-reduced location 14, the camera 50 should be placed in the interior space of the cylindrically-shaped outer skeleton part 15, as shown in FIG. 8(*c*).

Third Embodiment

Next, the third embodiment of the present invention is explained, where attention is drawn to the fact that those locations constitutionally identical to their counterparts in each of the aforementioned embodiments are denoted by the same symbols and not explained.

As shown in FIG. 9(*a*), the touch panel in this embodiment is characterized in that it has an air-filled transparent cushion 30 inside.

The touch panel body part V is attached to a side face of the cushion 30, and thus expands in the perpendicular direction. According to the touch panel system in this embodiment, deflection of the lower side of the touch panel body part V due to downward movement of the fluid 20, as shown in FIG. 9(*b*), can be prevented by the action of expanding pressure from the air filled inside the cushion 30. As a result, the touch panel system operates normally regardless of the angle, including orthogonal to the ground, of the touch panel body part V. Also, a camera-securing pocket 34 made of a transparent material may be provided on the cushion 30 to secure the camera 50, as shown in FIG. 9(*a*). The reason why the camera securing pocket 34 is made transparent is to prevent the material of the pocket from interfering with the image-capturing of the opposite face 12 when such capturing is done from the outside of the cushion 30 without using the camera securing pocket 34.

It should be noted that the touch panel body part V may be placed vertically by using a low-flexibility material for the touch panel body part V and thereby preventing it from deflecting downward due to the weight of the fluid 20; alternatively, vertical placement may be realized by attaching strings to the four corners of the touch panel body part V and applying tension to pull the strings.

Fourth Embodiment

Next, the fourth embodiment of the present invention is explained, where attention is drawn to the fact that those locations constitutionally identical to their counterparts in each of the aforementioned embodiments are denoted by the same symbols and not explained.

As shown in FIG. 10(b), the touch panel system in this embodiment is such that its touch panel body part V is shaped as a cylinder that can be self-supported on the ground 41. It should be noted that, if the center of gravity is too high to achieve stability in self-supported state, a weight 35 or other self-supporting mechanism should be provided at the bottom part.

By shaping the touch panel body part V as a self-supported cylinder, the touch panel system can be utilized as a sandbag for boxing or exercise. To be specific, the coordinates and shape of the distance-reduced location 14 can be acquired when the user punches or kicks the touch face 11 with a fist, leg, etc., and an image reflecting the acquired result can be output to the image display device 200.

Fifth Embodiment

Next, the fifth embodiment of the present invention is explained, where attention is drawn to the fact that those locations constitutionally identical to their counterparts in each of the aforementioned embodiments are denoted by the same symbols and not explained.

As shown in FIG. 10(c), the touch panel system in this embodiment is such that its touch panel body part V is shaped in the likeness of a human head and torso.

By shaping the touch panel body part V as a flexible or pliable humanoid, the coordinates and shape of the distance-reduced location 14 can be acquired when the humanoid-shaped touch panel body part V is touched by the user's hand UH, and an image reflecting the acquired result can be output to the image display device 200.

Sixth Embodiment

Next, the sixth embodiment of the present invention is explained, where attention is drawn to the fact that those locations constitutionally identical to their counterparts in each of the aforementioned embodiments are denoted by the same symbols and not explained.

As shown in FIG. 11(a) and FIG. 11(b), the touch panel system in this embodiment utilizes a juice, beer or other colored fluid as the colored fluid 20, and its touch panel body part V is shaped in the likeness of a drinking water glass or drinking water bottle.

Normally the side faces of glasses and bottles for holding drinking water are made of hard glass, acrylic, etc.; in this embodiment, however, a touch face 11 made of a transparent flexible material is provided at least in a part of the side face for operating the touch panel system. In FIG. 11, the touch face 11 is provided on the side face, near the bottom face, of the glass or bottle. A pushing operation by the user's hand UH displaces the fluid 20, or specifically, drinking water, inside, causing the touch face 11 and the opposite face 12 to make contact or be separated only by the stroke distance d2 or less. It should be noted that, by adjusting the RGB values that trigger a distance-reduced location 14 determination by the image analysis part 100 according to the transparency and color of a juice or beer, drink and liquid seasoning of various transparencies and colors can be supported.

It should be noted that, if the fluid 20 inside must be changed, the top opening part of the bottle or glass should be used directly as the fill port 13 for fluid 20.

Seventh Embodiment

Next, the seventh embodiment of the present invention is explained, where attention is drawn to the fact that those locations constitutionally identical to their counterparts in each of the aforementioned embodiments are denoted by the same symbols and not explained.

As shown in FIG. 12, the touch panel system in this embodiment is such that the touch face 11 of the touch panel body part V has a color different from that of the fluid 20. When an external force is applied to the touch face 11 by the user's hand UH and the touch face 11 and the opposite face 12 make contact as a result, the distance-reduced location 14 as viewed from the camera 50 appears colored, by the color of the touch face 11, through the transparent opposite face 12. As a result, the color of the distance-reduced location 14 as viewed from the camera 50 remains consistent with the color of the touch face 11, regardless of the user's hand UH color or race or the illumination environment in the surroundings, and consequently the accuracy of the touch panel system can be increased. Also, setting the touch face 11 to a complementary color (contrast color) to the color of the fluid 20 (in the example in FIG. 12, the color of the fluid 20 is red R: 255, G: 0, B: 0, while the color of the touch face 11 is blue R: 0, G: 0, B: 255) increases the contrast between the pixels in the distance-reduced location 14 area and the pixels in the remaining area, of the camera-captured image 51 (i.e., increases the fluctuation of RGB values between the pixels in the two areas), which makes it easy to identify the pixels at the distance-reduced location 14 and thereby increases the accuracy even higher.

Eighth Embodiment

Next, the eighth embodiment of the present invention is explained, where attention is drawn to the fact that those locations constitutionally identical to their counterparts in each of the aforementioned embodiments are denoted by the same symbols and not explained.

As shown in FIG. 13, the touch panel system in this embodiment is such that the border part 16 (four sides of the border) of the opposite face 12 has a color different from the color of the fluid 20 (in the example in FIG. 13, the color of the fluid 20 is red R: 255, G: 0, B: 0, while the color of the border part 16 is black R: 0, G: 0, B: 0). This permits recognition, by RGB analysis, of the area of the opposite face 12 even when an object 42 of the same color as the fluid 20 is reflected in the image captured by the camera 50, which means that the object 42 of the same color as the fluid 20 can be eliminated as noise and accuracy can be improved as a result.

Ninth Embodiment of Touch Panel

Next, the ninth embodiment of the present invention is explained, where attention is drawn to the fact that those locations constitutionally identical to their counterparts in each of the aforementioned embodiments are denoted by the same symbols and not explained.

As shown in FIG. 14, the touch panel system in this embodiment has multiple touch panel body part V1, touch panel body part V2, and fluids 23, 24 of different colors are contained in the respective touch panel body parts V1, V2. In the example in FIG. 14, a fluid 23 whose liquid color is red (liquid Color1 (C1)), R:255, G:0, B:0, is charged in the touch panel body part V1, while a fluid 24 whose liquid color is blue (liquid Color (C2)), R:0, G:0, B:255, is charged in the touch panel body part V2.

And, as shown in FIG. 15, the RGB values of the fluid 23 and those of the fluid 24 are used to perform image analysis in the image analysis part 100 (STEP 2), to discriminate, and assign IDs accordingly, to the touch panel body part V1 and the touch panel body part V2.

Since the touch panel system in this embodiment allows the multiple touch panel body parts V1, V2 to be charged with the fluids 23, 24 of different colors and assigned IDs accordingly, which of the multiple touch panel body parts was touched by the user's hand UH can be discriminated and an image reflecting this information can be output to the image display device 200.

Tenth Embodiment

Next, the tenth embodiment of the present invention is explained, where attention is drawn to the fact that those locations constitutionally identical to their counterparts in each of the aforementioned embodiments are denoted by the same symbols and not explained.

As shown in FIG. 16(b), even when an external force is applied by the user's hand UH to cause the touch face 11 and the opposite face 12 to make contact, water droplets 43 may remain at the distance-reduced location 14 due to the action of surface tension, etc., and become noise in image analysis, resulting in lower accuracy. To prevent this from happening, a water-repellent material 37 can be applied on the surfaces contacted by the fluid 20, of at least one (or both) of the touch face 11 and the opposite face 12, as shown in FIG. 16(a), to prevent noise from generating due to water droplets 43 remaining at the distance-reduced location 14.

It should be noted that, instead of applying a water-repellent material, a water-repellent material may be used to make at least one of the touch face and the opposite face.

Eleventh Embodiment

Next, the eleventh embodiment of the present invention is explained, where attention is drawn to the fact that those locations constitutionally identical to their counterparts in each of the aforementioned embodiments are denoted by the same symbols and not explained.

As shown in FIG. 17, the touch panel system in this embodiment is characterized in that it has a fluid pressure control mechanism 38 for controlling the pressure applied to the touch panel body part V from the fluid 20, and the fluid pressure control mechanism 38 changes the pressure based on at least one of three things—coordinates of the distance-reduced location 14, shape of the distance-reduced location, and reduced distance.

To be specific, an electric pump or other fluid pressure control mechanism 38 for changing the pressure of the fluid 20 in the touch panel body part V is provided on the touch panel body part V. Then, the analysis result, by the image analysis part 100, of the image captured by the camera 50 is fed back to the fluid pressure control mechanism 38 to have the pressure of the fluid changed; this way, the hardness or cushion property felt by the user when his/her hand UH touches the touch face 11 can be adjusted in real time. For example, by making the vertical and horizontal coordinates of the distance-reduced location 14 as calculated by the image analysis part 100 (expressed by XY coordinates in FIG. 17), depth by which the user's hand UH sank into the touch face 11 (reduced distance) (expressed by Z coordinate in FIG. 17) and other position coordinate information to be reflected in the driving control by the fluid pressure control mechanism 38, the hardness or cushion property of the touch face can be changed according to the coordinates of the touched position.

The specific processing flow that takes place in the image analysis part 100 at this time is shown in FIG. 18.

First, in STEP 1, the captured image of the opposite face 12 including the distance-reduced location 14, which has been captured by the camera 50, is imported into the image import part 101.

In STEP 2 that follows, the RGB values of the color of the fluid 20, which have been saved in the fluid-color RGB value save part 102, are acquired by the image RGB analysis part 103 (in the example in FIG. 18, the color of the fluid 20 is red and its RGB values are R: 255, G: 0, B: 0), and these RGB values are used to filter the respective pixel values of the captured image in sequence, to extract the pixels in the area not colored by the color of the fluid 20 (pixels with RGB values other than R: 255, G: 0, B: 0 in the example in FIG. 18). Then, the coordinates within the captured image as well as relative coordinates or shapes within the opposite face 12 are acquired for these pixels, which are then sent to the image output part 104 as coordinate or shape data of the area of the distance-reduced location 14.

Lastly, in STEP 3, the image output part 104 generates a pointer image, etc., based on the coordinate or shape data of the area of the distance-reduced location 14, and this image is output to the image display device 200. Simultaneously, in STEP 4, a fluid pressure control part 105 (part of the fluid pressure control mechanism 38) outputs control signals according to the coordinate or shape data of the area of the distance-reduced location 14, to the electric pump or other fluid pressure control mechanism 38, to change the fluid pressure of the fluid 20 inside the touch panel body part V, upon which the processing ends.

It should be noted that the hardness or cushion property of the touch face 11 may be made controllable in real time by changing the pressure of the fluid 20 in real time using an electric pump as the fluid pressure control mechanism 38.

Or, as shown in FIG. 19, a hose or other jet injection device 39 capable of discharging a water stream in any directions inside the touch panel body part V may be used as the fluid pressure control mechanism 38. In this case, a water stream may be injected directly in the direction of the distance-reduced location 14 to change the pressure of the fluid 20 only near the distance-reduced location 14, thereby saving energy. It should be noted that, regarding a specific control method for orienting the jet from the jet injection device 39 in the direction of the distance-reduced location 14, a motor or other known servo mechanism, etc., should be used. The injecting direction of the jet should be calculated using the coordinates of the area of the distance-reduced location 14.

Twelfth Embodiment

Next, the twelfth embodiment of the present invention is explained, where attention is drawn to the fact that those locations constitutionally identical to their counterparts in each of the aforementioned embodiments are denoted by the same symbols and not explained.

As shown in FIG. 20, a heater, cooler, or other fluid temperature control mechanism 44 for keeping the temperature of the fluid 20 constant, and a temperature sensor 45, can be provided to keep the temperature of the fluid 20 constant at, for example, the same temperature as human body temperature, regardless of the temperature of the ambient environment. Also, by shaping the touch panel body part V in the likeness of a human body, as shown in FIG. 20, a touch panel system having human body-like properties in terms of both pliability and body temperature can be obtained.

It should be noted that the touch panel adopting the method that uses infrared light, as disclosed in Japanese Patent No. 6086461 under [Patent Literature 3], presents a problem in that, because human body temperature is sensed by infrared thermography under this method, the distance-reduced location 14 cannot be detected by infrared thermography if the touch panel body part V is warmed to human skin temperature as shown in FIG. 20.

Thirteenth Embodiment

Next, the thirteenth embodiment of the present invention is explained, where attention is drawn to the fact that those locations constitutionally identical to their counterparts in the aforementioned embodiments are denoted by the same symbols and not explained.

As explained in the second embodiment, touch panels of various shapes can be obtained by adhering outer skeleton parts 15 of various shapes to the opposite face 12 of the touch panel body part V.

As shown in FIG. 21, an outer-skeleton-part shape-control part 210 for deforming the shape of the outer skeleton part 15 using an electrical mechanism may be provided. Also, as shown in FIG. 22, the outer-skeleton-part shape-control part 210 may be designed to control the shape of the outer skeleton part 15 based on at least one of two things—coordinates of the distance-reduced location 14 and shape of the distance-reduced location 14.

Methods for deforming the shape of the outer skeleton part 15 using an electrical mechanism include, for example, one where a moving part 212 of the outer skeleton part 15 is driven using an electric motor 211, as shown in FIG. 21. Also, there are other methods, though not illustrated, such as one where a string is passed around the outer periphery of the outer skeleton part 15 and an electric reel, etc., is used to stretch this string, one where electrically-driven artificial muscle fibers are contracted, one where a cushion is inflated and deflated using air pressures generated by an electric pump, and one where an electric self-propelled object is brought to contact the outer skeleton part 15, and the like; however, the present invention is not limited to the foregoing. Driving of such electric motor, electric reel, artificial muscle fibers, electric pump, or other electrical mechanism is controlled by the outer-skeleton-part shape-control part 210.

According to this embodiment, the user can utilize the outer skeleton part 15 to deform the touch panel body part V to various shapes at any timings. In the case of the constitution shown in FIG. 22, the outer-skeleton-part shape-control part 210 controls the driving of the electrical mechanism in response to a pushing operation by the user, to change the shape of the touch panel body part V.

The material of the outer skeleton part 15 is not limited in any way so long as it is hard enough to maintain the touch panel body part V in a deformed state; however, preferably a transparent material that transmits light is used at least partially so as not to interfere with the image-capturing of the opposite face 12 by the camera 50.

It should be noted that, while the touch panel body part V is deformed using the outer skeleton part 15 in this embodiment, a transparent solid frame may be embedded inside the touch panel body part V and the moving part 212 attached to this frame, to be drive-controlled by the outer-skeleton-part shape-control part 210.

Fourteenth Embodiment

Next, the fourteenth embodiment of the present invention is explained, where attention is drawn to the fact that those locations constitutionally identical to their counterparts in the aforementioned embodiments are denoted by the same symbols and not explained.

As shown in FIG. 23, joining parts 215 for joining the touch face 11 and the opposite face 12 may be placed in the space inside the touch panel body part V. Preferably the joining parts 215 are placed at intervals in an array form. Tensions F are applied to the touch face 11 and the opposite face 12 by the joining parts 215, and the distance d between the touch face 11 and the opposite face 12 is forcibly maintained at the length L of the joining parts 215. This way, the distance d can be maintained at a roughly constant value L over the entire range of the touch panel body part V, even when the touch panel body part V is tilted.

It should be noted that the narrower the interval between the adjacent joining parts 215, that is, the greater the number of joining parts 215 per unit area of the touch face 11, the greater the tension F per unit area becomes, and consequently the effect of maintaining the distance d at a constant value L can be increased.

The touch panel body part V may also be partially raised or concaved by changing the length of the joining parts 215 and thereby changing the distance d. The material of the joining parts 215 is not limited in any way, but preferably a flexible material is used so as not to disturb the pliability of the touch panel body part V when touched by the user U.

Preferably the portion (colored area 216) of the joining part 215 to be joined to the opposite face 12 has the same color as the fluid 20. By making the colored area 216 the same color as the fluid 20, detection of unwanted noise during image analysis can be prevented.

Fifteenth Embodiment

Next, the fifteenth embodiment of the present invention is explained, where attention is drawn to the fact that those locations constitutionally identical to their counterparts in the aforementioned embodiments are denoted by the same symbols and not explained.

As shown in FIG. 24(a), projecting parts 220 of different lengths can be provided on the touch face 11 to change the stroke distance d2. By making the projecting parts 220 a different color than the fluid 20, the accuracy of calculating the distance-reduced location 14 can be improved.

Furthermore, the stroke distance d2 can be kept at a constant value when a touch panel body part V is used whose thickness is not uniform overall because the touch face 11 curves, as shown in FIG. 24(b). As described above, the stroke distance d2 can be freely adjusted for each area of the touch panel body part V by adjusting the lengths of the projecting parts 220. It should be noted that attachments that are adapted to attach to the tips of the projecting parts 220 may be provided so as to provide a mechanism to change the entire lengths of the projecting parts 220 including the attachments by attaching the attachments to any projecting parts 220 among the multiple projecting parts 220. The projecting parts 220 may be provided on the opposite face 12, or they may be provided on both the touch face 11 and the opposite face 12.

Sixteenth Embodiment

Next, the sixteenth embodiment of the present invention is explained, where attention is drawn to the fact that those locations constitutionally identical to their counterparts in the aforementioned embodiments are denoted by the same symbols and not explained.

As shown in FIG. 25, multiple vibrators 230 may be placed in an array form inside the touch panel body part V, as a fluid pressure control mechanism 38. By driving only the vibrators 230 near the distance-reduced location 14, only the pressure of fluid 20 near the distance-reduced location 14 can be changed, thus curtailing energy consumption. Also, the positions at which the vibrators 230 are placed, the number of vibrators 230, and their amplitude intensity, may be changed. If the vibrators 230 are placed in the fluid 20, they must be waterproofed. The vibrators 230 may also be placed on the outer surface of the opposite face 12 in a manner adhering to the surface, so that vibration will be transmitted through the opposite face 12.

INDUSTRIAL FIELD OF APPLICATION

The present invention relates to a touch panel system which has a simple device constitution, is not easily affected by ambient temperature, can deform when in use, and also makes detectable the degree of force of touching with a finger, etc., while also relating to a touch panel system that allows the hardness and cushion property of the touched location to be changed in real time, and therefore it has industrial applicability.

DESCRIPTION OF THE SYMBOLS

F Tension
L Length
V Touch panel body part
V1 Touch panel body part
V2 Touch panel body part
UH User's hand
U User
d Distance between the touch face and the opposite face (when not in contact)
d2 Stroke distance
1 Touch panel system
11 Touch face (transparent)
12 Opposite face (transparent)
13 Fill port
14 Distance-reduced location
15 Outer skeleton part (transparent)
16 Border part of opposite face (already colored)
20 Fluid
21 Fluid (low transparency)
22 Fluid (high transparency)
23 Fluid
24 Fluid
30 Cushion
31 Fill port
32 Airtight space inside (filled with air)
33 Transparent, pliable material (constituent material of cushion)
34 Camera securing pocket (transparent)
35 Weight (for stabilizing center of gravity when self-supported)
36 Lid
37 Water-repellent material
38 Fluid pressure control mechanism (electric pump)
39 Fluid pressure control mechanism (jet injection device)
40 Table leg part
41 Ground
42 Object of the same color as the fluid (noise)
43 Water droplet remaining at the distance-reduced location (noise)
44 Fluid temperature maintenance mechanism (heater, etc.)
45 Temperature sensor
50 Camera
51 Camera-captured image (image for image analysis)
100 Computer (image analysis part)
101 Image import part
102 Fluid-color RGB value save part
103 Image RGB analysis part (touched location identification part)
104 Image output part
105 Fluid pressure control part
200 Image display device
201 Pointer image
202 Character string image (Strong Push)
203 Character string image (Weak Push)
204 Character string image (No Push)
205 Character string image (Push detected)
210 Outer-skeleton-part shape-control part
211 Electric motor
212 Moving part
215 Joining part
216 Colored area
220 Projecting part
230 Vibrator

What is claimed is:

1. A touch panel system, comprising:
   a touch panel body part shaped like a bag, having a touch face made of a flexible material, and an opposite face to the touch face made of a material that transmits visible light, wherein a colored fluid is contained in a space sandwiched between the touch face and the opposite face;
   a camera capable of capturing light of visible wavelengths, for taking an image of the opposite face; and
   an image analysis computer for analyzing RGB values of pixels in an image captured by the camera;
   the touch panel system characterized in that:
   the camera captures, when an external force is applied to the touch face, a change in a color of the opposite face resulting from the touch face and the opposite face coming closer in distance and the fluid moving from a distance-reduced location; and
   the image analysis computer calculates at least one of two things—coordinates of the distance-reduced location and shape of the distance-reduced location—based on RGB value analysis results of the pixels in the image captured by the camera, and reflects a result in an image on an image display device.

2. The touch panel system according to claim 1, characterized in that the image analysis computer calculates a reduced distance between the touch face and the opposite face at the distance-reduced location by comparing RGB values of the fluid and RGB values of the pixels in the captured image.

3. The touch panel system according to claim 1, characterized in that a color or transparency of the fluid can be changed.

4. The touch panel system according to claim 1, characterized in that the fluid is a liquid.

5. The touch panel system according to claim 1, characterized in that the fluid is viscous.

6. The touch panel system according to claim 1, characterized in that at least one of the touch face and the opposite face has a color different from that of the fluid.

7. The touch panel system according to claim 1, characterized in that a solid sheet-shaped object that transmits visible lights is adhered to the opposite face.

8. The touch panel system according to claim 1, characterized in that the touch panel body part can be self-supported.

9. The touch panel system according to claim 1, characterized in that the touch panel body part is shaped to a likeness of a human body part.

10. The touch panel system according to claim 1, characterized in that the fluid is a drink, and the touch panel body part is a bottomed cylinder having a top opening.

11. The touch panel system according to claim 1, characterized in that a border part of the opposite face has a color different from a color of the fluid.

12. The touch panel system according to claim 1, characterized in that a surface contacted by the fluid, of at least one of the touch face and the opposite face, is water-repellent.

13. The touch panel system according to claim 1, characterized in that the touch panel body part has a transparent pocket for housing the camera.

14. The touch panel system according to claim 1, characterized in that it has a transparent cushion filled with air inside, and the touch panel body part is fixed on a side face of the cushion.

15. The touch panel system according to claim 1, characterized in that it has multiple touch panel body parts, and the fluid of a different color is contained in each of the touch panel body parts.

16. The touch panel system according to claim 1, characterized in that it has a fluid pressure control mechanism for controlling a pressure applied from the fluid to the touch panel body part, and the fluid pressure control mechanism changes the pressure based on at least one of two things—coordinates of the distance-reduced location and shape of the distance-reduced location.

17. The touch panel system according to claim 16, characterized in that the fluid pressure control mechanism has an electric pump, and the pressure is changed as a result of the electric pump pumping or discharging the fluid into/from the touch panel body part.

18. The touch panel system according to claim 16, characterized in that the fluid pressure control mechanism has a jet injection device, and the jet injection device injects a jet of the fluid toward the distance-reduced location.

19. The touch panel system according to claim 1, characterized in that it has a fluid temperature control mechanism for controlling a temperature of the fluid.

20. The touch panel system according to claim 1, characterized in that the image display device is a head-mounted display.

* * * * *